US006703581B2

(12) United States Patent
Jones et al.

(10) Patent No.: US 6,703,581 B2

(45) Date of Patent: Mar. 9, 2004

(54) CONTACT START PLASMA TORCH

(75) Inventors: Joseph P. Jones, Lebanon, NH (US); Roger W. Hewett, Plainfield, NH (US); Kevin D. Horner-Richardson, Cornish, NH (US); David A. Small, Strafford, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 515 days.

(21) Appl. No.: 09/794,540

(22) Filed: Feb. 27, 2001

(65) Prior Publication Data

US 2002/0117483 A1 Aug. 29, 2002

(51) Int. Cl.[7] ................................................ B23K 10/00

(52) U.S. Cl. ............................ 219/121.57; 219/121.54; 219/121.52; 219/121.59

(58) Field of Search ........................ 219/121.52, 121.54, 219/121.57, 121.59, 121.51, 121.48, 74, 75; 315/111.21; 313/231.31

(56) References Cited

U.S. PATENT DOCUMENTS

| | | | |
|---|---|---|---|
| 3,004,189 | A | 10/1961 | Giannini |
| 3,242,305 | A | 3/1966 | Kane et al. |
| 3,242,314 | A | 3/1966 | Eckles |
| 3,557,337 | A | 1/1971 | Sipos et al. |
| 3,832,513 | A | 8/1974 | Klasson |
| 4,049,943 | A | 9/1977 | Pratt |
| 4,055,741 | A | 10/1977 | Bykhovsky et al. |
| 4,558,201 | A | 12/1985 | Hatch |
| 4,567,346 | A | 1/1986 | Marhic |
| 4,580,032 | A | 4/1986 | Carkhuff |
| 4,581,516 | A | 4/1986 | Hatch et al. |
| 4,590,354 | A | 5/1986 | Marhic et al. |
| 4,650,956 | A | 3/1987 | Marhic et al. |
| 4,678,888 | A | 7/1987 | Camacho et al. |
| 4,682,005 | A | 7/1987 | Marhic |
| 4,691,094 | A | 9/1987 | Hatch et al. |
| 4,692,584 | A | 9/1987 | Caneer, Jr. |
| 4,701,590 | A | 10/1987 | Hatch |
| 4,716,269 | A | 12/1987 | Carkhuff |
| 4,766,286 | A | 8/1988 | Iceland |
| 4,767,908 | A | 8/1988 | Dallavalle et al. |

(List continued on next page.)

FOREIGN PATENT DOCUMENTS

DE 40 18 423 A1 12/1991

*Primary Examiner*—Mark Paschall

(74) *Attorney, Agent, or Firm*—Harness, Dickey & Pierce, P.L.C.

(57) ABSTRACT

A contact start plasma torch and method of starting the torch includes a negatively charged cathode body and a positively charged anode body. A conductive element in the torch is constructed of an electrically conductive material and is free from fixed connection with the cathode body and the anode body. The torch is operable between an idle mode wherein the conductive element provides an electrically conductive path between the cathode body and the anode body and an pilot mode wherein a pilot arc is formed between the conductive element and at least one of the cathode body and the anode body. The pilot arc is blown by working gas flowing through the torch toward an exit orifice of the torch whereby the working gas is exhausted from the torch in the form of an ionized plasma.

65 Claims, 10 Drawing Sheets

U.S. PATENT DOCUMENTS

| | | | |
|---|---|---|---|
| 4,775,774 | A | 10/1988 | Caneer, Jr. |
| 4,777,343 | A | 10/1988 | Goodwin |
| 4,791,268 | A | 12/1988 | Sanders et al. |
| 4,839,492 | A | 6/1989 | Bouchier et al. |
| 4,865,252 | A | 9/1989 | Rotolico et al. |
| 4,891,489 | A | 1/1990 | Bollinger et al. |
| 4,896,016 | A | 1/1990 | Broberg et al. |
| 4,902,871 | A | 2/1990 | Sanders et al. |
| 4,940,877 | A | 7/1990 | Broberg |
| 4,967,055 | A | 10/1990 | Raney et al. |
| 4,987,285 | A | 1/1991 | Dallavalle et al. |
| 4,996,407 | A | 2/1991 | Traxler |
| 5,083,005 | A | 1/1992 | Degrigny |
| 5,164,569 | A | 11/1992 | Porra et al. |
| 5,208,441 | A | 5/1993 | Broberg |
| 5,210,392 | A | 5/1993 | Labrot et al. |
| 5,216,221 | A | 6/1993 | Carkhuff |
| 5,225,658 | A | 7/1993 | Yamaguchi et al. |
| 5,278,388 | A | 1/1994 | Huang et al. |
| 5,329,089 | A | 7/1994 | McGee et al. |
| 5,393,952 | A | 2/1995 | Yamaguchi et al. |
| 5,416,297 | A | 5/1995 | Luo et al. |
| 5,440,094 | A | 8/1995 | Zapletal |
| 5,548,097 | A | 8/1996 | Couch, Jr. et al. |
| 5,660,745 | A | 8/1997 | Naor |
| 5,681,489 | A | 10/1997 | Carkhuff |
| 5,726,415 | A | 3/1998 | Luo et al. |
| 5,728,991 | A | 3/1998 | Takada et al. |
| 5,796,067 | A | 8/1998 | Enyedy et al. |
| 5,828,030 | A | 10/1998 | Naor |
| 5,886,315 | A | 3/1999 | Lu et al. |
| 5,893,985 | A | 4/1999 | Luo et al. |
| 5,897,795 | A | 4/1999 | Lu et al. |
| 5,906,758 | A | 5/1999 | Severance, Jr. |
| 5,938,949 | A | 8/1999 | Enyedy et al. |
| 5,965,040 | A | 10/1999 | Luo et al. |
| 5,990,443 | A | 11/1999 | Tatham et al. |
| 5,994,663 | A | 11/1999 | Lu |
| 6,054,670 | A | 4/2000 | Naor |
| 6,084,199 | A | 7/2000 | Lindsay et al. |
| 6,093,903 | A | 7/2000 | Schneider |
| 6,133,543 | A | 10/2000 | Borowy et al. |
| 6,163,008 | A | 12/2000 | Roberts et al. |
| 6,163,009 | A | 12/2000 | Hardwick et al. |
| 6,207,923 | B1 | 3/2001 | Lindsay |

CONTACT START PLASMA TORCH

BACKGROUND OF THE INVENTION

This invention relates generally to plasma arc torches, and more particularly to a contact start plasma arc torch.

Plasma arc torches, also known as electric arc torches, are commonly used for cutting, welding, and spray bonding metal workpieces. Such torches typically operate by directing a plasma consisting of ionized gas particles toward the workpiece. In general, a pressurized gas to be ionized is directed through the torch to flow past an electrode before exiting the torch through an orifice in the torch tip. The electrode has a relatively negative potential and operates as a cathode. The torch tip, which is adjacent to the end of the electrode at the front end of the torch, constitutes a relatively positive potential anode. When a sufficiently high voltage is applied to the torch, an arc is established across the gap between the electrode and the torch tip, thereby heating the gas and causing it to ionize. The ionized gas in the gap is blown out of the torch and appears as a flame extending externally from the tip. As the torch head or front end is positioned close to the workpiece, the arc transfers between the electrode and the workpiece because the impedance of the workpiece to negative potential is typically lower than the impedance of the torch tip to negative potential. During this "transferred arc" operation, the workpiece serves as the anode.

Plasma arc torches may be found in both "non-contact start" and "contact start" varieties. In non-contact start torches, the tip and electrode are normally maintained at a fixed physical separation in the torch head. Typically, a high voltage high frequency signal is applied to the electrode (relative to the tip) to establish a pilot arc between the electrode and the tip. As mentioned above, when the torch head is moved toward the workpiece, the arc transfers to the workpiece. By way of contrast, in conventional contact start torches, the tip and/or the electrode make electrical contact with each other generally at the bottom of the electrode. For example, a spring or other mechanical means biases the tip and/or electrode longitudinally such that the tip and electrode are biased into electrical contact to provide an electrically conductive path between the positive and negative sides of the power supply. When the operator squeezes the torch trigger, a voltage is applied to the electrode and pressurized gas flows through the torch to the exit orifice of the torch tip. The gas causes the tip and/or the electrode to overcome the bias and physically separate. As the tip and electrode separate, a pilot arc established therebetween is blown by the gas toward the exit orifice of the tip.

One disadvantage associated with the conventional contact start plasma torch described above is that repeated axial movement of the electrode, the tip or both can result in axial misalignment between the electrode and tip. Also, by establishing the pilot arc between the electrode and the tip at the bottom of the electrode, damage is caused to the tip adjacent the central exit orifice of the tip. Axial misalignment of the electrode and tip, as well as any damage to the tip, can result in decreased torch performance and/or cut quality. Consequently, frequent replacement of the tip is required. For conventional contact start torches in which the tip is movable for establishing electrical contact with the electrode, the tip is in different longitudinal positions in the on and off modes of the torch, making it cumbersome for an operator to control the relative position of the tip with respect to a workpiece being cut. It is also difficult to conduct drag cutting of a workpiece, where the tip is set down onto the workpiece during cutting, because the tip would be undesirably moved into contact with the electrode upon being set down onto the workpiece.

SUMMARY OF THE INVENTION

Among the several objects and features of the present invention is the provision of a contact start plasma torch and method of operating such a torch which reduces the frequency of torch tip replacement; the provision of such a torch and method which reduces the risk of axial misalignment between the electrode and the tip; the provision of such a torch which reduces the risk of tip damage adjacent the central exit orifice of the tip; and the provision of such a torch and method which eliminates the need for axial movement of the electrode and/or the tip to generate a pilot arc.

In general, a contact start plasma torch of the present invention comprises a cathode body adapted for electrical communication with the negative side of a power supply and an anode body adapted for electrical communication with the positive side of the power supply. A primary gas flow path directs working gas from a source of working gas through the torch. A conductive element of the torch is constructed of an electrically conductive material and is free from fixed connection with the cathode body and the anode body. The torch is operable between an idle mode in which the conductive element provides an electrically conductive path between the cathode body and the anode body and a pilot mode in which a pilot arc formed between the conductive element and at least one of said cathode body and said anode body is adapted for initiating operation of the torch by exhausting working gas in the primary gas flow path from the torch in the form of an ionized plasma.

Another embodiment of the present invention is directed to a contact start plasma torch of the type having a primary gas flow path for directing a working gas through the torch whereby the working gas is exhausted from the torch in the form of an ionized plasma. The torch of this embodiment generally comprises an electrode having a longitudinally extending side surface and a bottom surface. A tip surrounds the electrode in spaced relationship therewith to at least partially define the primary gas flow path of the torch for directing a working gas through the torch in a downstream direction. The tip has a central exit orifice in fluid communication with the primary gas flow path for exhausting working gas from the torch. The bottom surface of the electrode is in longitudinally opposed relationship with the central exit orifice of the tip. Opposed contact surfaces are disposed in the torch, with at least one of the contact surfaces being movable relative to the other one of the contact surfaces. The torch is operable between an idle mode in which the contact surfaces are positioned relative to each other to provide an electrically conductive path therebetween and a pilot mode in which the contact surfaces are in spaced relationship with each other whereby a pilot arc is formed between the contact surfaces. The contact surfaces are disposed in the torch upstream from the bottom surface of the electrode whereby the pilot arc is formed generally within the primary gas flow path upstream from the bottom surface of the electrode and is blown by working gas in the primary gas flow path toward the central exit orifice of the tip for exhausting working gas from the tip in the form of an ionized plasma.

A conductive element of the present invention is adapted for use in a contact start plasma torch of the type having an electrode in electrical communication with the negative side of a power supply and a tip surrounding the electrode in spaced relationship therewith to at least partially define a primary gas flow path of the torch, the tip being in electrical communication with the positive side of the power supply and having a central exit orifice in fluid communication with the primary gas flow path for exhausting working gas from the tip in the form of an ionized plasma. The conductive element generally comprises a generally cup-shaped body constructed of an electrically conductive material. The conductive element is adapted for movement relative to the electrode and the tip between a first position is corresponding to an idle mode of the torch in which the conductive element provides an electrically conductive path between the positive side of the power supply and the negative side of the power supply and a second position spaced from the first position of the conductive element. The second position of the conductive element corresponds to a pilot mode of the torch whereby movement of the conductive element toward its second position forms a pilot arc generally within the primary gas flow path capable of initiating operation of the torch for exhausting working gas from the torch in the form of an ionized plasma.

An electrode of the present invention is adapted for use in a contact start plasma torch of the type having a primary gas flow path for directing a working gas in a downstream direction through the torch, a tip surrounding the electrode in spaced relationship therewith to at least partially define the primary gas flow path of the torch, a contact surface in the torch for forming a pilot arc in primary gas flow path of the torch and a central exit orifice in the tip communicating with the primary gas flow path for exhausting working gas from the tip in the form of an ionized plasma. The electrode generally comprises a generally cylindrical body having a longitudinally extending side surface. A bottom surface of the electrode is oriented generally radially relative to the longitudinally extending side surface for longitudinally opposed positioning relative to the central exit orifice of the tip. A contact surface is disposed above the bottom surface of the electrode and is engageable with the contact surface said tip being generally cup-shaped and having a central exit opening adapted for fluid communication with the primary gas flow path for exhausting working gas from the tip in the form of an ionized plasma, the tip further having a top surface and an annular projection extending up from the top surface for use in radially positioning the tip in the torch.

A tip of the present invention is adapted for use in a contact start plasma torch of the type having a primary gas flow path for directing a working gas through the torch whereby the working gas is exhausted from the torch in the form of an ionized plasma. The tip is generally cup-shaped and has a central exit opening adapted for fluid communication with the primary gas flow path for exhausting working gas from the tip in the form of an ionized plasma. The tip further has a top surface and an annular projection extending up from the top surface for use in radially positioning the tip in the torch.

In another embodiment, a tip of the present invention is adapted for use in a plasma torch of the type having a primary gas flow path for directing a working gas through the torch whereby the working gas is exhausted from the torch in the form of an ionized plasma and a secondary gas flow path for directing gas through the torch whereby the gas is exhausted from the torch other than in the form of an ionized plasma. The tip is generally cup-shaped and has a central exit opening adapted for fluid communication with the primary gas flow path for exhausting working gas from the tip in the form of an ionized plasma. The tip further has at least one metering orifice adapted for fluid communication with the secondary gas flow path for metering the flow of gas through the secondary gas flow path.

A contact assembly of the present invention is adapted for use in a contact start plasma torch of the type having a primary gas flow path for directing a working gas through the torch, an electrode in electrical communication the negative side of a power supply and a tip surrounding the electrode in spaced relationship therewith to at least partially define the primary gas flow path of the torch. The contact assembly generally comprises a conductive element constructed of an electrically conductive material and an enclosure surrounding the conductive element in fluid communication with a source of pressurized gas for receiving gas into the enclosure. The conductive element is disposed at least partially within the enclosure and is moveable relative to the enclosure, the electrode and the tip in response to pressurized gas received in the enclosure whereby movement of the conductive element forms a pilot arc in the torch.

An electrode assembly of the present invention is adapted for use in a contact start plasma torch of the type having a cathode body adapted for electrical communication with the negative side of a power supply and an anode body adapted for electrical communication with the positive side of the power supply. The electrode assembly generally comprises an electrode extending longitudinally within the torch and defining at least in part the cathode body of the torch. An insulating sleeve surrounds at least a portion of the electrode and is constructed of an electrically non-conductive material to insulate the at least a portion of the electrode against electrical communication with the anode body of the torch.

A method of the present invention is used for starting a contact start plasma torch of the type having a cathode body in electrical communication with the negative side of a power supply and an anode body in electrical communication with the positive side of the power supply, with the anode body being positioned relative to the cathode body to at least partially define a primary gas flow path of the torch and the torch having a central exit orifice in fluid communication with the primary gas flow path for exhausting working gas from the torch in the form of an ionized plasma. The method generally comprises the act of causing an electrical current to flow along an electrically conductive path comprising the anode body, the cathode body and a conductive element electrically bridging the cathode body and the anode body in a first position of the conductive element corresponding to an idle mode of the torch. Working gas is directed from a source of working gas through the primary gas flow path of the torch. Movement of the conductive element relative to the cathode body and the anode body toward a second position corresponding to a pilot mode of the torch is effected whereby a pilot arc is formed between the conductive element and at least one of said cathode body and said anode body as the conductive element is moved toward its second position. The pilot arc is then blown through the primary gas flow path toward the central exit orifice of the torch such that working gas is exhausted from the primary gas flow path of the torch in the form of an ionized plasma.

In another embodiment, a method of the present invention involves starting a contact start plasma torch of the type having an electrode positioned on a longitudinal axis of the torch in electrical communication with the negative side of a power supply and having a longitudinally extending side surface and a bottom surface. The method generally comprises positioning opposed contact surfaces of the torch relative to each other generally within the primary gas flow path upstream from the bottom surface of the electrode to provide an electrically conductive path through the contact surfaces. The contact surfaces are then repositioned relative to each other to form a pilot arc therebetween in the primary gas flow path of the torch upstream from the bottom surface of the electrode. Working gas from a source of working gas is directed to flow through the primary gas flow path of the torch to blow the pilot arc downstream within the primary gas flow path toward the central exit orifice of the anode body.

Further, a shield cup of the present invention is adapted for use in a plasma torch of the type having a primary gas flow path for directing a working gas through the torch whereby the working gas is exhausted from the torch in the form of an ionized plasma and a secondary gas flow path for directing gas through the torch whereby the gas is exhausted from the torch other than in the form of an ionized plasma, with the torch having at least one metering orifice in the secondary gas flow path for metering the flow of gas through the secondary gas flow path. The shield cup is generally cup-shaped and is adapted for at least partially defining the secondary gas flow path. The shield cup is further adapted to define a tertiary gas flow path in fluid communication with the secondary gas flow path for further exhausting gas in the secondary gas flow path from the torch. The shield cup has at least one metering orifice in the tertiary gas flow path for metering the flow of gas through the tertiary gas flow path.

Other objects and features will be in part apparent and in part pointed out hereinafter.

BRIEF DESCRIPTION OF THE DRAWINGS

Corresponding reference characters are intended to indicate corresponding parts throughout the drawings.

DETAILED DESCRIPTION OF THE PREFERRED EMBODIMENTS

Figure 1:
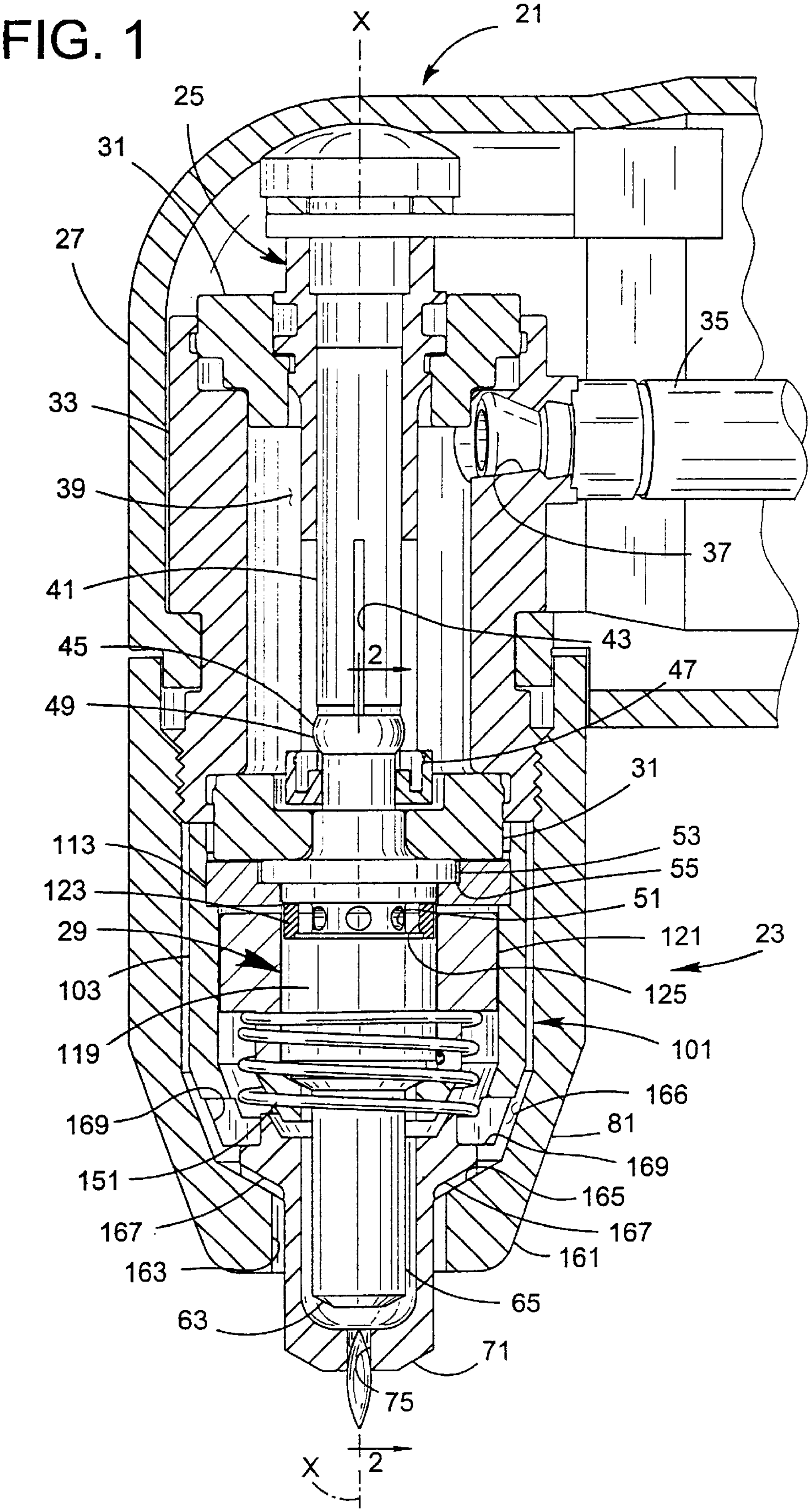
FIG. 1 is a fragmentary section of a contact start plasma torch of the present invention.

With reference to the various drawings, and in particular to FIG. 1, a portion of a plasma arc torch of the present invention is generally indicated at 21. The torch 21 includes a torch head, generally indicated at 23, having a cathode, generally indicated at 25, secured in a body 27 of the torch, and an electrode, generally indicated at 29, electrically connected to the cathode. Annular insulating members 31 constructed of a suitable electrically insulating material, such as a polyamide or polyimide material, surround upper and lower portions of the cathode 25 to electrically insulate the cathode from a generally tubular anode 33 that surrounds the cathode. The anode 33 is in electrical communication with the positive side of a power supply (not shown), such as by cable 35. The cathode 25 is electrically connected to the negative side of the power supply. The anode 33 has an intake port 37 for receiving a primary working gas, such as pure oxygen or air, into the torch head 23. More particularly, the primary gas intake port 37 of the anode 33 is in fluid communication, such as by the cable 35, with a source (not shown) of working gas for receiving working gas into an annular channel 39 formed by the spacing between the anode and the cathode 25. A central bore (not shown) extends longitudinally within a lower connecting end 41 of the cathode 25. Slots 43 extend longitudinally within the lower connecting end 41 of the cathode 25 to provide fluid communication between the cathode bore and the anode channel 39, thereby permitting working gas in the anode channel to flow down into the torch head 23 via the cathode bore.

Still referring to FIG. 1, the electrode 29 has an upper connecting end 45 for connecting the electrode with the connecting end 41 of the cathode 25 in coaxial relationship therewith about a central longitudinal axis X of the torch head 23. As a result, the electrode 29 is electrically connected to the cathode, and hence in electrical communication with the negative side of the power supply. The electrode 29 and cathode 25 together broadly define a cathode body of the torch 21 in electrical communication with the negative side of the power supply. In the illustrated embodiment, the connecting ends 41, 45 of the cathode 25 and the electrode 29 are configured for a coaxial telescoping connection with one another in the manner shown and described in co-owned U.S. Pat. No. 6,163,008, which is incorporated herein by reference. To establish this connection, the cathode connecting end 41 and electrode connecting end 45 are formed with opposing detents generally designated 47 and 49, respectively. These detents 47, 49 are interengageable with one another when the connecting end 45 of the electrode 29 is connected to the cathode 25 to inhibit axial movement of the electrode away from the cathode. It is understood, however, that the electrode 29 may be connected to the cathode 25 in other conventional manners, such as by threaded connection, without departing from the scope of this invention.

A central bore (not shown) extends longitudinally within the upper connecting end 45 of the electrode 29 and is in fluid communication with the central bore of the cathode connecting end 41 such that working gas in the cathode central bore is directed down through the central bore of the electrode. The central bore of the electrode 29 extends down from the top of the electrode into registry with gas distributing holes 51 extending radially outward from the central bore for exhausting working gas from the electrode. An annular collar 53 having a jogged, or stepped diameter extends radially outward from the upper connecting end 45 of the electrode 29 above the gas distributing holes 51. The stepped diameter of the collar 53 defines an annular flange 55 for longitudinally positioning the electrode 29 in the torch head 23 as described later herein.

Figure 2:
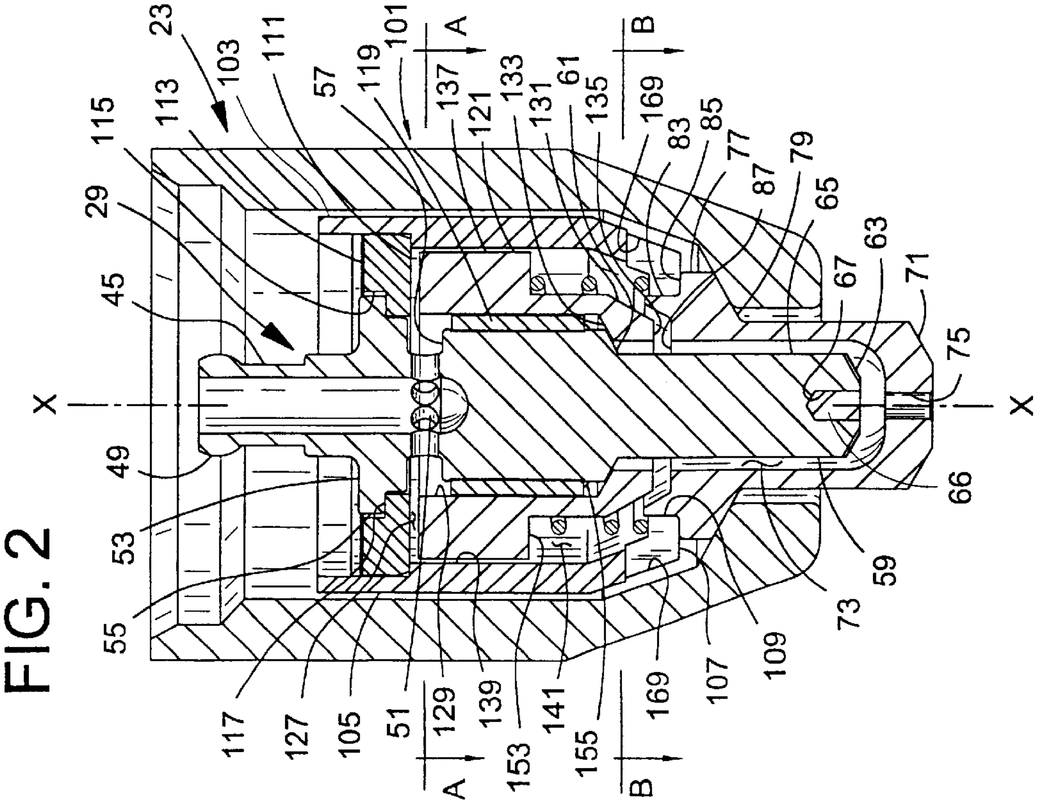
FIG. 2 is a portion of a section taken in the plane of line 2—2 of FIG. 1 with a conductive element shown in a raised position corresponding to an idle mode of the torch.

With reference to FIG. 2, the electrode 29 has a cylindric mid-section 57 extending longitudinally below the central bore and gas distributing holes 51 and having a substantially enlarged outer diameter. The outer diameter of the electrode 29 gradually decreases as the electrode extends down from the bottom of the mid-section 57 toward a lower end 59 of the electrode to define a tapered contact surface 61 on the electrode. The lower end 59 of the electrode 29 includes a bottom surface 63 oriented generally radially with respect to the central longitudinal axis X of the torch 21 and a side surface 65 extending generally longitudinally up from the bottom surface to the tapered contact surface 61 of the electrode. The electrode 29 of the illustrated embodiment is constructed of copper and has an insert 66 of emissive material (e.g., hafnium) secured in a recess 67 in the bottom surface 63 of the electrode.

A generally cup-shaped metal tip 71, also commonly referred to as a nozzle, is disposed in the torch head 23 surrounding the lower end 59 of the electrode 29 in radially and longitudinally spaced relationship therewith to form a primary gas passage 73 (otherwise referred to as an arc chamber or plasma chamber) between the tip and the electrode. A central exit orifice 75 of the tip 71 communicates with the primary gas passage 73 for exhausting working gas from the torch 21 and directing the gas down against a workpiece. The outer diameter of the tip 71 increases as the tip extends up toward an upper end 77 of the tip to define a tapered lower contact surface 79 engageable by a shield cup 81, as discussed later herein, for securing the tip in the torch head 23. An annular projection 83 extends up from the top of the tip 71 and is positioned generally centrally thereon such that the top of the tip defines an upwardly facing annular shoulder 85 disposed radially outward of the annular projection and an upwardly facing contact surface 87 disposed radially inward of the projection. An inner surface 88 (FIG. 3B) of the annular projection 83 slopes upward and radially outward from the upward facing contact surface 87 to the top of the annular projection.

Figure 3:
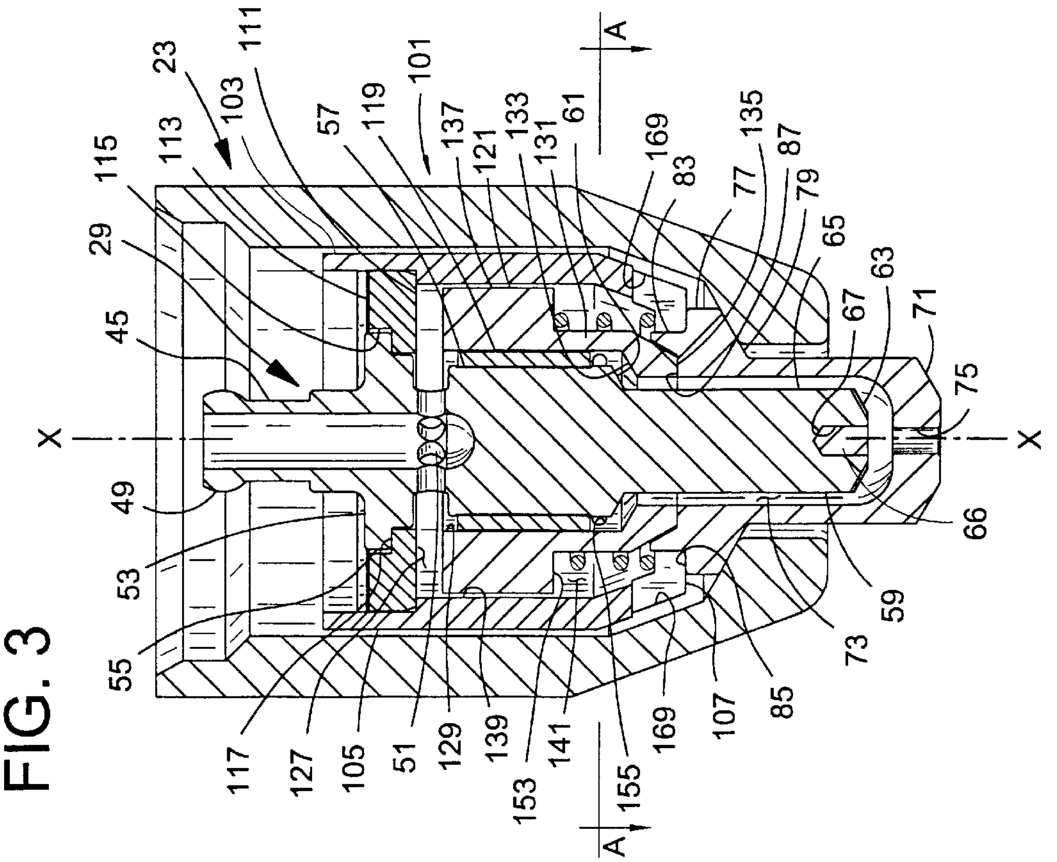
FIG. 3 is the section of FIG. 2 showing the conductive element in a lowered position corresponding to an pilot mode of the torch.

With particular reference to FIGS. 2 and 3, a contact assembly of the present invention is generally indicated at 101 and is operable between an idle mode (FIG. 2) and a pilot mode (FIG. 3) of the torch 21. In the idle mode of the torch, the contact assembly 101, the tip 71 to and the electrode 29 are relatively positioned such that the contact assembly provides an electrically conductive path between the positive side of the power supply and the negative side of the power supply without working gas being exhausted from the torch in the form of an ionized plasma. In the pilot mode of the torch 21 the contact assembly 101, the tip 71 and the electrode 29 are relatively positioned so that a pilot arc is formed in the torch head 23 and is adapted for initiating operation of the torch to exhaust working gas from the torch in the form of an ionized plasma. The contact assembly 101 of the illustrated embodiment comprises a tubular casing 103 having a generally cylindrical side wall 105 and an annular bottom wall 107 extending radially inward from the bottom of the side wall. The bottom wall 107 of the casing 103 has a central opening 109 for receiving therethrough the electrode 29 and the annular projection 83 extending up from the tip 71 whereby the bottom wall of the casing seats on the outer annular shoulder 85 formed by the tip and the annular projection to radially and longitudinally position the tip in the torch head 23 relative to the contact assembly and to electrically connect the tip and the casing.

The tubular casing 103 of the illustrated embodiment is constructed of an electrically conductive metal, preferably brass, and is sized to extend sufficiently upward in the torch head 23 so that the side wall 105 of the casing contacts the bottom of the anode 33 when the bottom wall 107 of the casing seats on the tip 71 to electrically connect the casing and the anode. As a result, the anode 33, the tip 71 and the casing 103 are in electrical communication with the positive side of the power supply and together broadly define an anode body of the torch. It is contemplated that the tubular casing 103 of the contact assembly 101 may instead be formed integrally with the tip 71 without departing from the scope of this invention.

An interior shoulder 111 is formed in the side wall 105 of the casing 103 slightly below its upper end to seat a cap 113 of the contact assembly within the casing. As shown in the illustrated embodiment, the assembly cap 113 is annular and has a central opening 115 to receive the electrode 29 therethrough. The assembly cap 113 has a jogged, or stepped inner diameter in the opening 115 to define a shoulder 117 sized in accordance with the stepped outer diameter of the annular collar 53 extending radially outward from the electrode 29. The annular flange 55 defined by the collar 53 is sized for seating on the shoulder 117 in the central opening 115 of the cap 113 to longitudinally position the electrode 29 in the torch head 23 relative to the contact assembly 101 and the tip 71. The collar also radially positions the electrode in coaxial relationship with the contact assembly and the tip on the central longitudinal axis X of the torch 21. The tubular contact assembly casing 103 and the assembly cap 113 together broadly constitute an enclosure defined by the contact assembly 101 for containing working gas in the contact assembly.

Figure 2A:
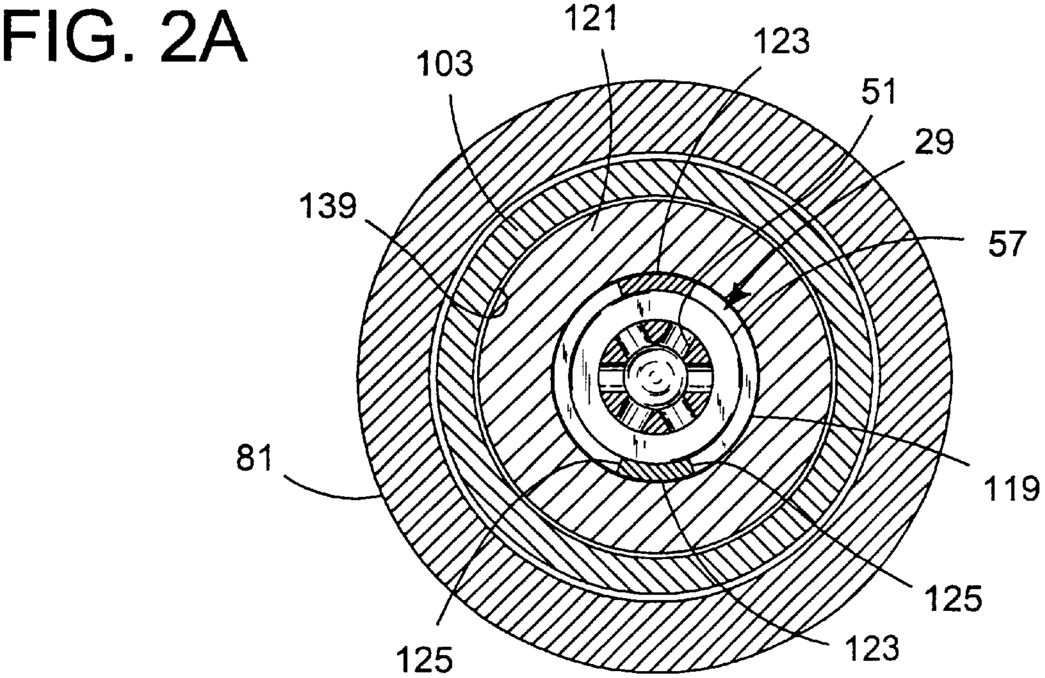
FIG. 2A is a section taken in the plane of line A—A of FIG. 2.

An insulating sleeve 119 constructed of an electrically non-conductive material surrounds the enlarged mid-section 57 of the electrode 29 in close contact therewith to electrically insulate the mid-section of the electrode against electrical communication with a conductive element 121 surrounding the electrode within the contact assembly casing 103. Diametrically opposed tabs 123 (FIGS. 1, 2A) extend up from the top of the insulating sleeve 119 and contact the bottom of the annular collar 53 of the electrode 29 to longitudinally position the sleeve on the electrode. Arcuate openings 125 (FIG. 2A) extend circumferentially between the tabs 123 in radial registry with the gas distributing holes 51 of the electrode 29 to permit gas exhausted from the electrode through the gas distributing holes to flow outward through the insulating sleeve to an upper gas chamber 127 (broadly, a high pressure gas chamber) of the enclosure defined by the contact assembly casing 103 and the assembly cap 113 (FIG. 3). The insulating sleeve 119 is preferably secured to the electrode 29, such as by being press-fit onto the electrode, such that the electrode and insulating sleeve together broadly define an electrode assembly that can be installed in or removed from the torch as a unit.

The conductive element 121 is generally cup-shaped and is disposed within the tubular casing 103. The conductive element 121 of the illustrated embodiment has a central passage 129 for receiving the electrode 29 therethrough with the inner surface of the conductive element surrounding the insulating sleeve 119 in closely spaced relationship therewith and the outer surface of the conductive element in closely spaced relationship with the inner surface of the casing 103. The conductive element 121 is free from fixed connection to the electrode 29 and cathode 25 (i.e., the cathode body) and the anode 33, contact assembly casing 103 and tip 71 (i.e., the anode body). The term "free from fixed connection" as used herein means that relative movement is possible between the conductive element and the cathode body and anode body in at least one direction, such as axially and/or radially. For example, in the illustrated the conductive element is free to move axially along the central longitudinal axis X of the torch head 23 within the enclosure defined by the casing and the assembly cap 113. More particularly, the conductive element 121 is axially movable relative to the electrode 29, insulating sleeve 119, tubular casing 103 and tip 71 between a first, raised position (FIG. 2) corresponding to the idle mode of the torch 21 and a second, lowered position (FIG. 3) corresponding to the pilot mode of the torch. It is understood, however, that the conductive element 121 may be free to move radially relative to the cathode body and the anode body. It is also understood that the conductive element 121 may instead be stationary within the torch and either the cathode body, the anode body or both may be free to move, axially and/or radially, relative to the conductive element.

Figure 3A:
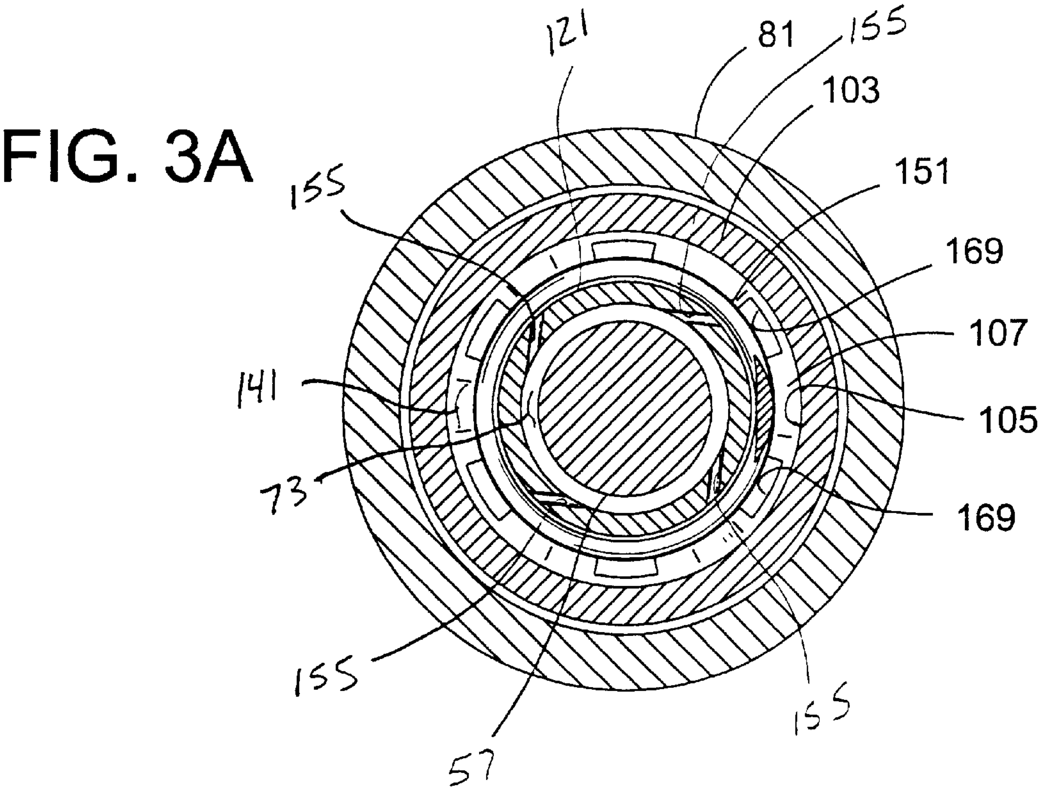
FIG. 3A is a section taken in the plane of line A—A of FIG. 3.
Figure 3B:
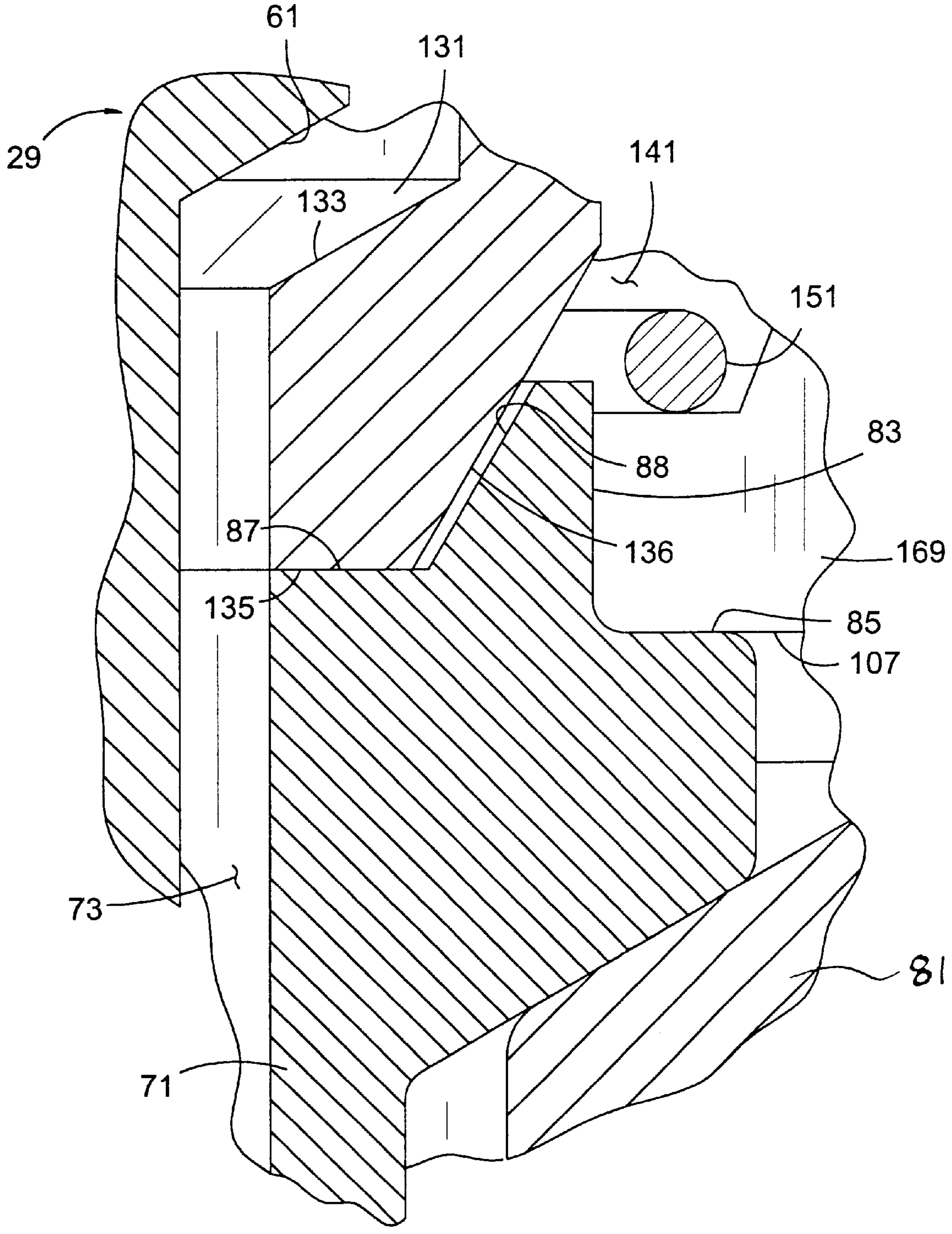
FIG. 3B is an enlarged portion of the contact start plasma torch of FIG. 3.

The inner surface of the conductive element 121 tapers inward as the conductive element extends down to a lower end 131 of the element to define an upper contact surface 133 of the conductive element. The upper contact surface 133 is tapered at an angle generally corresponding to the tapered contact surface 61 of the electrode 29 and is generally disposed in axially opposed (e.g., face-to-face) relationship therewith. The bottom of the conductive element 121 defines a generally radially oriented lower contact surface 135 disposed in axially opposed (e.g., face-to-face) relationship with the upper contact surface 87 of the tip 71 extending radially inward from the annular projection 83. As shown in FIG. 3B, a portion 136 of the outer surface of the conductive element slopes generally upward and radially outward from the contact surface 135 and is sized radially to be as close as possible to the inner surface of the annular projection 83 without contacting the annular projection so that the lower contact surface 135 of the conductive element 121 will contact the upper contact surface 87 of the tip 71 when the conductive element is in its lowered position. For example, the conductive element 121 of the illustrated embodiment is spaced about 0.0043 inches from the inner surface of the annular projection 83 in the lowered position of the conductive element.

The conductive element 121 also includes an upper end 137 in close, radially spaced relationship with the inner surface of the side wall 105 of the contact assembly casing 103, beneath the upper gas chamber 127 of the enclosure, to define a relatively narrow (e.g., 0.005 in.) annular passage 139 between the conductive element and the casing. The lower end 131 of the conductive element 121 has an outer diameter substantially less than that of the upper end 137 to define, together with the casing 103, a lower gas chamber 141 (broadly, a low pressure gas chamber) of the enclosure in fluid communication with the upper gas chamber 127 via the narrow passage 139 formed between the conductive element and the casing side wall 105.

A coil spring 151 (broadly, a biasing member) is disposed in the lower gas chamber 141 of the contact assembly 101 in radially spaced relationship with both the outer surface of the conductive element 121 and the inner surface of the tubular casing side wall 105. The spring 151 seats on the bottom wall 107 of the contact assembly casing 103 and is sized axially for contacting a bottom surface 153 of the upper end 137 of the conductive element 121. The coil spring 151 of the illustrated embodiment is constructed of an electrically conductive material such that the spring is electrically connected at one end (its upper end) to the conductive element 121 and at the opposite (lower) end to the contact assembly casing 103. As a result, the conductive element 121 remains in electrical communication with the contact assembly casing 103 and, therefore, with the positive side of the power supply, as the conductive element moves between its raised and lowered positions. It is understood that the spring 151 may instead be electrically connected to the tip 71, without departing from the scope of this invention, as long as the conductive element remains in electrical communication with the positive side of the power supply. The spring 151 preferably remains in compression in the raised and lowered positions of the conductive element 121 to maintain electrical communication between the contact assembly casing 103 and the conductive element and to continually bias the conductive element toward its raised position (FIG. 2) corresponding to the idle mode of the torch 21.

When the conductive element 121 is in its raised position, its upper contact surface 133 engages the contact surface 61 of the electrode 29 to provide electrical communication between the conductive element and the electrode, thereby completing an electrically conductive path between the cathode body and the anode body, i.e., between the positive side of the power supply and the negative side of the power supply. The lower contact surface 135 of the conductive element 121 is longitudinally spaced from the upper contact surface 87 of the tip 71 in the raised position of the conductive element 121.

In the lowered position (FIGS. 3 and 3B) of the conductive element 121 corresponding to the pilot mode of the torch, the upper contact surface 133 of the conductive element is positioned down away from the lower contact surface 61 of the electrode 29. More preferably, the upper contact surface 133 of the conductive element 121 is positioned a distance from the lower contact surface 61 of the electrode 29 approximating the width of the primary gas passage 73. For example, in the illustrated embodiment the primary gas passage has a width of the about 0.044 inches and the contact surface 133 of the conductive element 121 is positioned a distance of about 0.040–0.045 inches from the lower contact surface 61 of the electrode 29.

As shown in FIG. 3B, the lower contact surface 135 of the conductive element 121 seats on the upper contact surface 87 of the tip 71 in the lowered position of the conductive element such that the conductive element and tip combine to define a portion of the primary gas passage 73. The portion 136 of the outer surface of the conductive element 121 extending up from the lower contact surface 135 is in closely spaced relationship with the inner surface 88 of the annular projection 83 extending up from the tip to provide sufficient clearance therebetween to permit the lower contact surface 135 of the conductive element to seat on the upper contact surface 87 of the tip. However, the spacing between the conductive element 121 and the inner surface 88 of the annular projection 83 is sufficiently close to restrict the flow of gas therebetween (e.g., the spacing therebetween is about 0.0043 inches, which is one-tenth of the width of the primary gas passage 73) to thereby inhibit working gas flowing down through primary gas passage 73 against flowing back into the lower gas chamber 141 between the tip and the conductive element. The inner surface 88 of the annular projection 83 also inhibits the conductive element against radial movement to thereby maintain the conductive element in coaxial relationship with the longitudinal axis X of the torch 21. It is understood, however, that since the tip 71 is already electrically connected to the contact assembly casing 103, the lower contact surface 135 of the conductive element 121 need not seat directly on the upper contact surface 87 of the tip to remain within the scope of this invention. It is also understood that the inner surface 88 of the annular projection 83 may extending vertically up from the upper contact surface 87 of the tip 71 without departing from the scope of the this invention.

Gas inlet holes 155 (FIG. 3A) extend through the conductive element 121 above its upper contact surface 133 to provide fluid communication between the lower gas chamber 141 of the contact assembly 101 and the primary gas passage 73 formed in part by the conductive element and the electrode 29 and in part by the tip. The gas inlet holes 155 of the illustrated embodiment extend generally tangentially through the conductive element 121 for causing a swirling action of working gas flowing into and down through the primary gas passage 73. Alternatively, the gas inlet holes 155 may extend radially through the conductive element 121.

Referring back to FIG. 1, the tip 71, electrode 29 and non-moving elements of the to contact assembly 101 (e.g., the casing 103 and the insulating sleeve 119) are secured in axially fixed position relative to each other during operation of the torch 21 by the shield cup 81. The shield cup 81 is constructed of a non-conductive, heat insulating material, such as fiberglass, and has internal threads for threadable engagement with corresponding external threads on the anode 33, which is fixed within the torch body 27. The shield may alternatively include a metal insert 682 (as shown in the alternative embodiments of FIG. 8 and FIG. 12) having internal threads for threadable engagement with the anode 33 without departing from the scope of this invention. A lower end 161 of the shield cup 81 has a central opening 163 sized to permit throughpassage of the tip 71 with the shield cup radially spaced from the tip in the central opening to define an annular secondary exit opening of the torch 21. The inner diameter of the lower end 161 of the shield cup 81 gradually increases as the shield cup extends up from the central opening 163 to define a contact surface 165 tapered at an angle generally corresponding to the tapered lower contact surface 79 of the tip 71 and in axially opposed (e.g., face-to-face) relationship therewith.

Figure 2B:
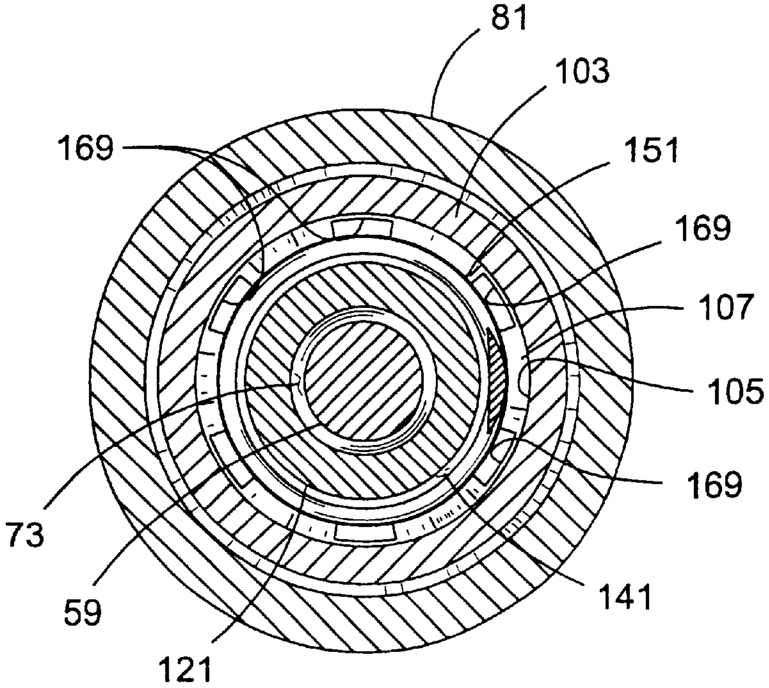
FIG. 2B is a section taken in the plane of line B—B of FIG. 2.

When the shield cup 81 is installed on the torch 21, the contact surface 165 of the shield cup 81 contacts the lower contact surface 79 of the tip 71 to axially secure the tip, and hence the contact assembly 101 and the electrode 29, within the torch head 23. The shield cup 81 extends up from the contact surface 165 in radially spaced relationship with the outer surface of the tip 71 to define a secondary gas chamber 166. Grooves 167 (FIG. 1) are formed in the lower contact surface 79 of the tip 71 to provide fluid communication between the secondary gas chamber 166 and the central opening 163 of the shield cup 81. Openings 169 (FIGS. 2, 2B) are disposed in the tubular casing 103 of the contact assembly 101 in fluid communication with the lower gas chamber 141 of the contact assembly to divert a portion of working gas in the lower gas chamber into the secondary gas chamber 166 for exhaustion from the torch 21 via the central opening 163 of the shield cup 81.

The shield cup 81, tip 71, contact assembly 101 and electrode 29 are consumable parts of the torch 21 in that the useful working life of these parts is typically substantially less than that of the torch itself and, as such, require periodic replacement.

In operation according to a method of the present invention for operating a contact start plasma arc torch, the torch 21 is initially in its idle mode (FIG. 2), with no current or gas flowing to the torch head. The conductive element 121 is biased by the coil spring 151 toward its raised position corresponding to the idle mode of the torch, with the upper contact surface 133 of the conductive element 121 engaging the downwardly facing contact surface 61 of the electrode 29 to provide an electrically conductive path between the positive and negative sides of the power supply. When operation of the torch 21 is desired, electrical current and working gas are introduced into the torch 21. More particularly, positive potential is directed from the power supply via the cable 35 to the anode 33 and flows through a circuit including the contact assembly casing 103, the coil spring 151, the conductive element 121, the electrode 29 and the cathode 25 back to the negative side of the power supply.

Working gas is directed from the source of working gas into the torch 21 and flows through a primary gas flow path comprising the anode intake port 37, anode channel 39, cathode bore, electrode bore, gas distributing holes 51 of the electrode 29, upper gas chamber 127 of the contact assembly 101, narrow passage 139 between the conductive element 121 and the inner surface of the casing 103, lower gas chamber 141 of the contact assembly, gas inlet holes 155 of the conductive element, primary gas passage 73 and central exit orifice 75 of the tip 71. A portion of working gas in the lower gas chamber 141 is directed to flow through a secondary gas flow path comprising the openings 169 in the contact assembly casing 103, secondary gas chamber 165 and the grooves 167 in the lower contact surface 79 of the tip 71 for exhaustion from the torch 21 via the central opening 163 of the shield cup 81. The flow of working gas from the upper gas chamber 127 to the lower gas chamber 141 is restricted by the narrow passage 139 formed between the conductive element 121 and the inner surface of the contact assembly casing 103. This causes gas pressure in the upper gas chamber 127 to increase and act against the upper end 137 of the conductive element 121, as in the manner of a piston, to move the conductive element against the bias of the spring 151 toward the lower gas chamber 141, i.e., toward the lowered position (FIG. 3) of the conductive element corresponding to the pilot mode of the torch 21. As an example, the pressure differential between the upper (high pressure) gas chamber 151 and the lower (low pressure) gas chamber 141 of the illustrated embodiment is about 1.7 psi.

As the conductive element 121 is moved toward its lowered position, the upper contact surface 133 of the conductive element 121 is moved down away from the contact surface 61 of the electrode 29 to substantially increase the spacing therebetween. A pilot arc is formed between the upper contact surface 133 of the conductive element 121 and the electrode contact surface 61, generally in the portion of the primary gas passage 73 (e.g., the primary gas flow path) formed by the conductive element and the electrode contact surface, and is exposed to a greater flow of working gas through the primary gas passage. The pilot arc is thus adapted for being blown by working gas flowing through the primary gas passage 73 down through the primary gas passage toward the central exit orifice 75 of the tip 71 for initiating operation of the torch by exhausting working gas from the tip in the form of an ionized plasma.

In the several embodiments of the contact start torch shown and described herein, including the torch 21 of the first embodiment of FIGS. 1–3, the conductive element 121 is shown and described as engaging the electrode (e.g., the anode body) in the idle mode of the torch to provide an electrically conductive path between the anode body and the cathode body. It is understood, however, that the conductive element 121 need not engage the anode body or the cathode body in the idle mode of the torch, as long as the conductive element is positioned sufficiently close to at least one of the cathode body and the anode body to provide an electrically conductive path between the positive and negative sides of the power supply. In such an instance, an arc may be formed between the conductive element 121 and the anode body or the cathode body in the idle mode of the torch, but such an arc is not considered to be a pilot arc as that term is commonly understood and as used herein because it is not adapted for initiating operation of the torch by exhausting working gas from the torch in the form of an ionized plasma.

Rather, any spacing between the conductive element and the anode body or the cathode body in the idle mode of the torch would be relatively small compared to the spacing therebetween in the pilot mode of the torch such that gas flow between the conductive element and the anode body or cathode body is substantially restricted and is therefore incapable of blowing any arc formed therebetween in the idle mode of the torch down toward the exit orifice of the tip to exhaust working gas from the torch in the form of an ionized plasma. Therefore, reference herein to a pilot arc formed in the torch upon movement of the conductive element toward its second position corresponding to the pilot mode of the torch means an arc formed between the conductive element and at least one of the cathode body and the anode body when the conductive element is sufficiently spaced from the cathode body and/or the anode body that the arc formed therebetween can be blown through the primary gas flow path to the exit orifice of the tip for initiating operation of the torch whereby working gas is exhausted from the torch in the form of an ionized plasma.

Further operation of the plasma arc torch 21 of the present invention to perform cutting and welding operations on a workpiece is well known and will not be further described in detail herein.

As shown in the drawings and described above, the conductive element 121 remains in electrical communication with the positive side of the power supply, via the coil spring 151 and the contact assembly casing 103, as the torch 21 operates between its idle mode and the pilot mode. However, it is understood that the conductive element 121 may instead remain in electrical communication with the negative side of the power supply as the torch 21 operates between its idle mode and pilot mode without departing from the scope of this invention. For example, the conductive element 121 may be electrically connected to the electrode or cathode (e.g., the cathode body) such that in the first position of the conductive element corresponding to the idle mode of the torch 21 the conductive element is in electrical communication with the tubular casing 103 or the tip 71 to provide an electrically conductive path between the positive and negative sides of the power supply. In the second position of the conductive element 121 corresponding to the pilot mode of the torch 21 the conductive element would remain in electrical communication with the negative side of the power supply and be moved away from the tubular casing 103 or tip 71 to form the pilot arc between the conductive element and the casing or tip in the primary gas flow path of the torch.

Additionally, the electrode 29 and the tip 71 are shown and described as being secured in the torch 21 in fixed relationship with each other as the conductive element 121 moves between its raised and lowered positions. However, the electrode 29, the tip 71 or both may move relative to each other and remain within the scope of this invention, and the conductive element 121 may or may not be secured against movement within the torch, as long as the conductive element is free from fixed connection with the electrode and the tip in at least one direction so that the conductive element can assume different positions relative to the electrode and the tip in the idle mode and the pilot mode of the torch 21.

Also, while the conductive element 121 is moved between its raised and lowered positions pneumatically, such as by a force generated by pressurized gas (e.g., the working gas flowing through the primary gas flow path), it is understood that the conductive element may be mechanically driven between its raised and lowered positions without departing from the scope of this invention.

Figure 5:
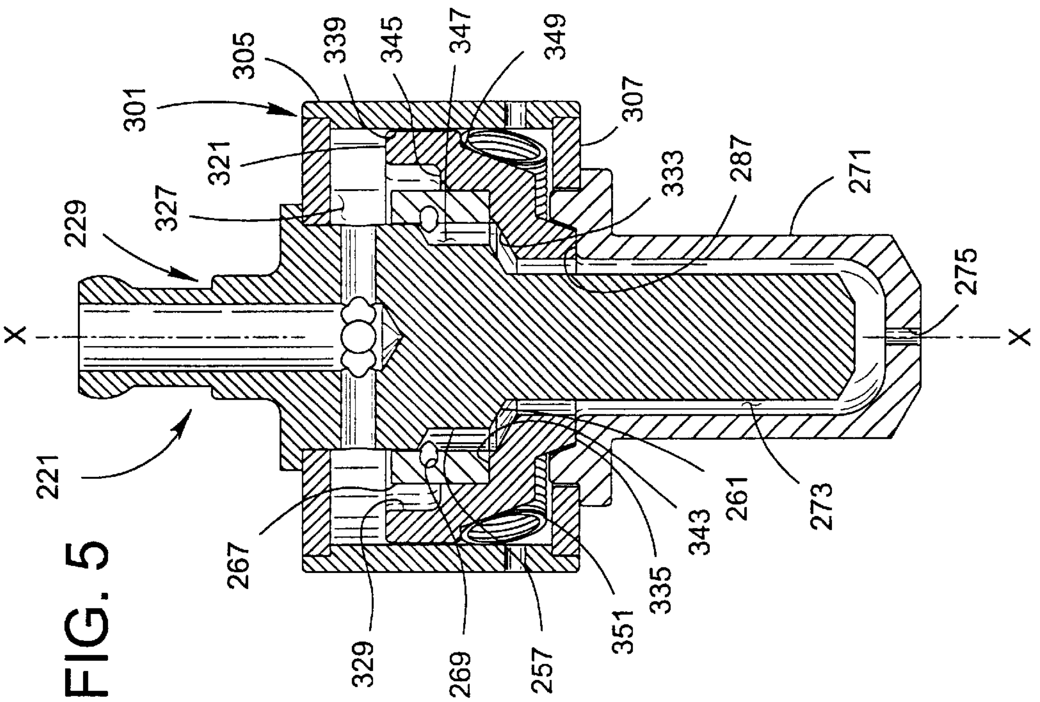
FIG. 5 is the section of FIG. 4 showing the conductive element in a lowered position corresponding to the pilot mode of the torch.
Figure 4:
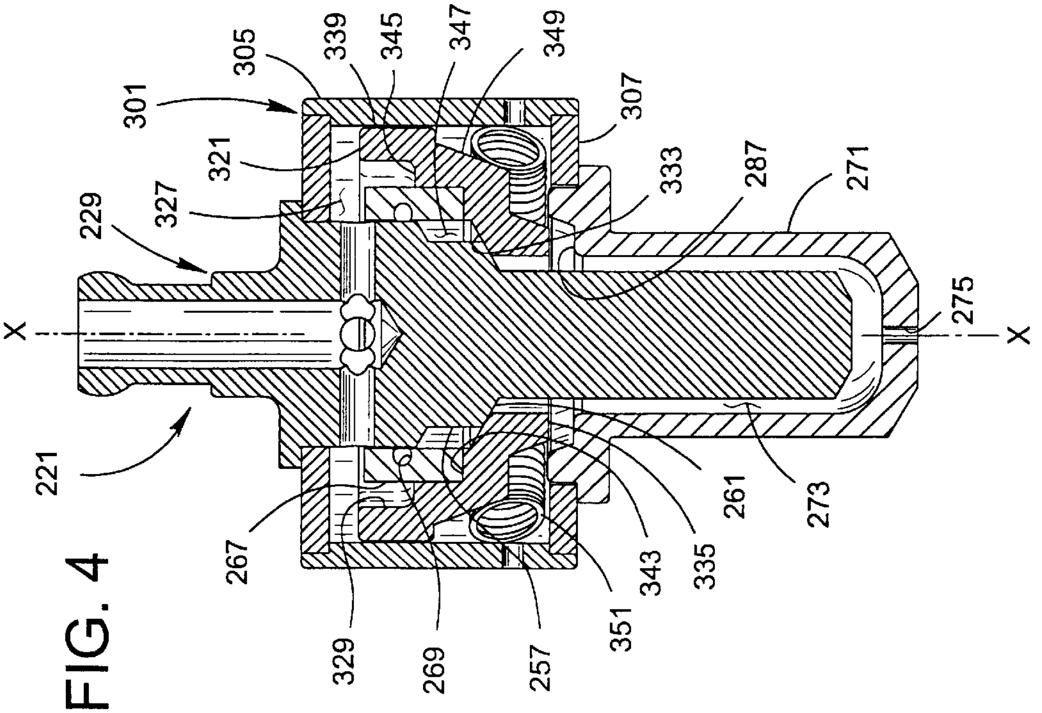
FIG. 4 is a section of a portion of a torch head of a second embodiment of a contact start plasma torch of the present invention with a conductive element shown in a raised position corresponding to the idle mode of the torch.

FIGS. 4 and 5 illustrate part of a second embodiment of a contact start plasma torch 221 of the present invention substantially similar to that of the first embodiment (FIGS. 1–3) in that it comprises an electrode 229 in electrical communication with the negative side of the power supply, a tip 271 in electrical communication with the positive side of the power supply, a contact assembly 301 operable between an idle mode and an pilot mode of the torch and a shield cup (not shown, but similar to the shield cup 81 of FIG. 1). A conductive element 321 of the contact assembly 301 of this second embodiment is generally cup-shaped and has a central passage 329 for receiving the electrode 229 therethrough. The inner diameter of the conductive element 321 is generally stepped, or jogged, to define an upper contact surface 333 of the conductive element, an intermediate shoulder 343 for seating a gas distributor 267 in the central passage 329 of the conductive element and an upper shoulder 345. The inner diameter increases along the upper contact surface 333 such that the contact surface is tapered at an angle generally corresponding to a tapered contact surface 261 of the electrode 229. The gas distributor 267 is generally annular and seats on the intermediate shoulder 343 of the conductive element 321 in closely spaced relationship with at least a portion of the mid-section 257 of the electrode 229. The gas distributor 267 is constructed of a non-conductive material to electrically insulate the mid-section 257 of the electrode 229 against electrical contact with the conductive element 321. Thus it will be seen that the gas distributor 267 can be broadly defined as an insulating sleeve similar to the insulating sleeve 119 of the first embodiment. The gas distributor 267 of the illustrated embodiment is connected to the conductive element 321, such as being press-fit or bonded thereto, so that the gas distributor and the conductive element can be installed in and removed from the torch as a single unit.

The mid-section 257 of the electrode 229 has a stepped outer diameter so that a portion of the outer surface of the mid-section is spaced radially inward of the gas distributor 267 to define a gas inlet 347 upstream of the contact surface 261 of the electrode. The gas distributor 267 has inlet holes 269 extending therethrough and located generally axially above the upper shoulder 345 of the conductive element 321 to provide fluid communication between the upper gas chamber 327 of the contact assembly 301 and the gas inlet 347 for directing gas in the upper gas chamber into the gas inlet. The inlet holes 269 of the illustrated embodiment extend generally tangentially through the gas distributor 267 for causing a swirling action of working gas flowing into the gas inlet and down through the primary gas passage 273. However, it is understood that the inlet holes 269 may extend radially through the gas distributor 267 without departing from the scope of this invention.

As in the first embodiment, the conductive element 321 of this second embodiment is capable of axial movement on the central longitudinal axis X of the torch 221 relative to the electrode 229, contact assembly casing 303 and tip 271 between a first, raised position corresponding to an idle mode of the torch and a second, lowered position corresponding to a pilot mode of the torch. The gas distributor 267, supported in the torch 221 by the conductive element 321, moves conjointly with the conductive element. A biasing member of this second embodiment is defined by an annular, canted coil spring 351 seated on the radially inward extending bottom wall 307 of the contact assembly casing 303 in contact with the side wall 305 of the casing. The spring 351 also contacts a tapered outer surface 349 of the conductive element 321 to bias the conductive element toward its raised position corresponding to the idle mode of the torch and to provide electrical communication between the conductive element and the contact assembly casing 303, i.e., the positive side of the power supply.

In the raised position (FIG. 4) of the conductive element 321, the upper contact surface 333 of the conductive element engages the downwardly facing contact surface 261 of the electrode 229 to provide electrical communication between the conductive element and the electrode, thereby completing an electrically conductive path between the contact assembly casing 303 and the electrode, i.e., between the positive side of the power supply and the negative side of the power supply. It is understood, however, that in its raised position the conductive element 321 need not engage the contact surface 261 of the electrode 229, as long as it is positioned sufficiently close to the electrode contact surface to provide an electrically conductive path between the positive and negative sides of the power supply. The lower contact surface 335 of the conductive element 321 is longitudinally spaced from the upper contact surface 287 of the tip 271 in the raised position of the conductive element. The inlet holes 269 of the gas distributor 267 are out of radial registry with the gas inlet 347 defined by the gas distributor and the spaced portion of the mid-section 257 of the electrode 229 to inhibit the flow of working gas in the upper gas chamber 327 of the contact assembly 301 into the gas inlet.

In the lowered position (FIG. 5) of the conductive element 321, the upper contact surface 333 of the conductive element 321 is positioned down away from the contact surface 261 of the electrode 229 (e.g., a distance greater than that between the upper contact surface of the conductive element and the electrode contact surface in the raised position of the conductive element). The gas inlet 347 is in fluid communication with the gas passage 273 formed between the electrode 229 and the tip 271, with the gas inlet further defining the primary gas flow path of the torch 221 when the conductive element is in its lowered position. The inlet holes 269 of the gas distributor 267 are in radial registry with the gas inlet 347 to direct working gas in the upper gas chamber 327 of the contact assembly 301 into the gas inlet and down through the gas passage 273 to the central exit orifice 275 of the tip 271.

Electrical operation of the contact start plasma torch 221 of this second embodiment is substantially similar to that of the first embodiment and will not be further described herein. To initiate operation of the torch, working gas is introduced into the torch and directed to flow into the upper gas chamber 327 of the contact assembly 301. With the inlet holes 269 of the gas distributor 267 out of registry with the gas inlet 347, the narrow passage 339 between the upper gas chamber 327 and the lower gas chamber 341 restricts the flow of working gas to the lower gas chamber. The gas pressure in the upper gas chamber 327 increases and acts down against the gas distributor 267 and the conductive element 321 to urge the conductive element to move down against the bias of the spring 351 toward the lowered position (FIG. 5) of the conductive element. As the upper contact surface 333 of the conductive element 321 is moved away from the contact surface 261 of the electrode 229, a pilot arc is formed therebetween. Further, the inlet holes 269 of the gas distributor 267 are moved down into radial registry with the gas inlet 347 as the conductive element is moved toward its lowered position. As a result, working gas in the upper gas chamber 327 of the contact assembly 301 is directed through the inlet holes 269 in the gas distributor 267 into the gas inlet 347. The working gas is then further directed down through the gas passage 273, blowing the pilot arc formed between the conductive element 321 and the electrode 229 down through the gas passage toward the central exit orifice 275 of the tip 271 to initiate operation of the torch whereby working gas is exhausted from the torch 221 in the form of an ionized plasma. The flow of working gas through a secondary gas flow path of the torch 221 of this second embodiment is the same as for the first embodiment and will not be further described herein.

Figure 7:
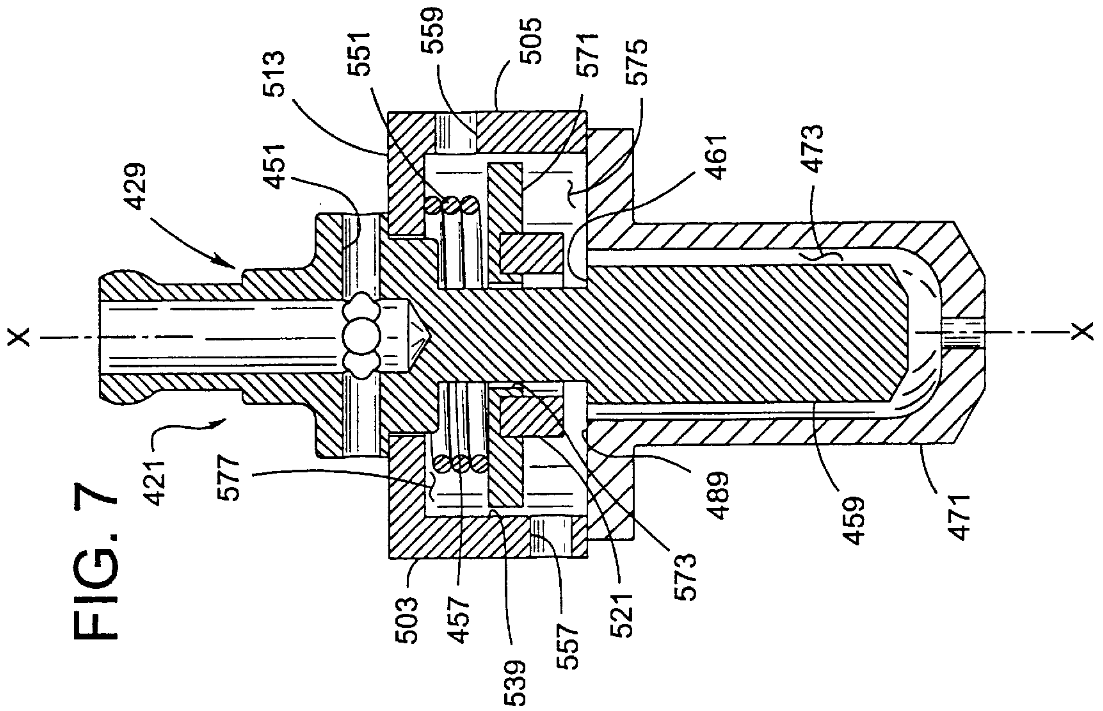
FIG. 7 is the section of FIG. 6 showing the conductive element in a raised position corresponding to the pilot mode of the torch.
Figure 6:
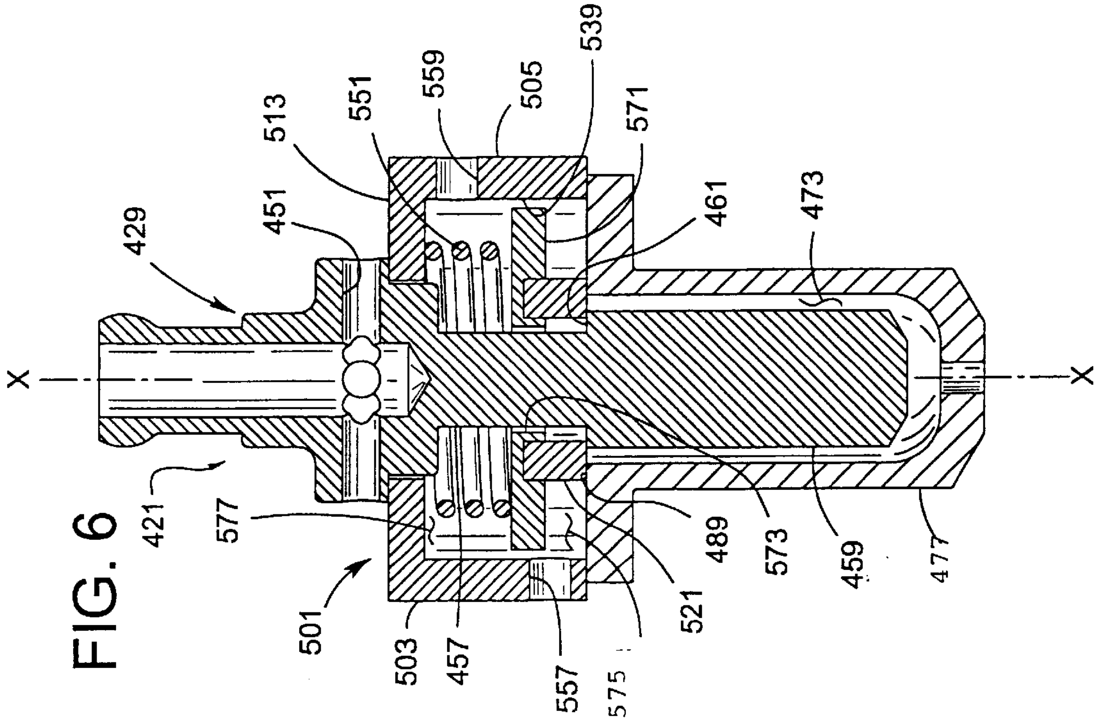
FIG. 6 is a section of a portion of a torch head of a third embodiment of a contact start plasma torch of the present invention with a conductive element shown in a lowered position corresponding to the idle mode of the torch.

FIGS. 6 and 7 illustrate a contact assembly 501 of a contact start plasma torch 421 of a third embodiment of the present invention in which the conductive element 521 of the contact assembly is electrically neutral. That is, the conductive element 521 does not remain electrically connected to any potential carrying structure, such as the cathode, the electrode 429, the tip 471 or the contact assembly casing 503.

In this third embodiment, the annular cap 513 of the contact assembly 501 is integrally formed with the tubular casing 503 and is in close, radially spaced relationship with the electrode 429 generally below the gas distributing holes 451 of the electrode. The contact assembly casing 503 seats on a radially outward extending upper surface 489 of the tip 471. The mid-section 457 of the electrode 429 is substantially narrowed within the casing 503 whereby the narrowed mid-section and the lower end 459 of the electrode form a shoulder defining a radially oriented contact surface 461 of the electrode. The electrode 429 and tip 471 are secured in generally fixed relationship with each other in the torch 421 with the contact surface 461 of the electrode in radially coplanar alignment with the upper surface 489 of the tip. The contact assembly casing 503 has an inlet hole 557 disposed in its side wall 505 adjacent the lower end of the side wall and an outlet hole 559, also disposed in the side wall, generally adjacent the upper end of the side wall.

An annular support plate 571 constructed of an electrically non-conductive material is disposed within the contact assembly casing 503 and has a central opening 573 through which the narrowed mid-section 457 of the electrode 429 extends. The conductive element 521 is also annular and is constructed of an electrically conductive material, such as brass. The conductive element 521 is secured to the underside of the support plate 571, such as being bonded thereto, and depends therefrom for conjoint movement of the conductive element with the support plate. The conductive element 521 of this third embodiment is axially movable on the central longitudinal axis X of the torch 421 relative to the electrode 429, the tip 471 and the contact assembly casing 503 between a first, lowered position (FIG. 6) corresponding to the idle mode of the torch and a second, raised position (FIG. 7) corresponding to the pilot mode of the torch. The annular width of the conductive element 521 is substantially greater than the width of the gas passage 473 formed between the tip 471 and the electrode 429 such that in the lowered position (FIG. 6) of the conductive element, the conductive element is in electrical communication with both the electrode and the tip to provide an electrically conductive path between the electrode and the tip, i.e., between the positive and negative sides of the power supply. It is understood that in its lowered position the conductive element 521 need not engage the contact surface 461 of the electrode 429 and the upper surface 489 of the tip 471, as long as it is positioned sufficiently close to the electrode and tip to provide an electrically conductive path between the positive and negative sides of the power supply.

In its raised position (FIG. 7), the conductive element 521 is positioned up away from the tip 471 and the electrode 429 (i.e., a distance greater than the distance between the conductive element and the electrode and tip in the lowered position of the conductive element) such that a pilot arc adapted for initiating operation of the torch is formed between the tip and the conductive element and another pilot arc capable of initiating operation of the torch is formed between the electrode and the conductive element. The biasing member of this third embodiment comprises a coil spring 551 that seats on the top of the support plate 571 and extends up into contact with the contact assembly cap 513. The spring 551 is preferably sized to remain in compression for continuously biasing the conductive element 521 toward its lowered position corresponding to the idle mode of the torch. Since the conductive element 521 of this third embodiment is electrically neutral, the spring 551 may be constructed of an electrically non-conductive material.

In the illustrated embodiment, the axial dimension of the conductive element 521 is such that in the lowered position (FIG. 6) of the conductive element, the support plate 571 is axially disposed above the inlet hole 557 in the side wall 505 of the casing 503 to divide the enclosure defined by the casing 503 and assembly cap 513 into a lower, high pressure gas chamber 575 below the plate and an upper, low pressure gas chamber 577 above the plate. The support plate 571 is spaced radially inward of the side wall 505 of the casing 503 to define a narrow passage 539 (e.g., 0.005 in.) between the upper and lower gas chambers 577, 575 of the enclosure for providing fluid communication therebetween. In this manner, working gas in the primary gas flow path enters the enclosure via the inlet hole 557 into the lower gas chamber 575. The narrow passage 539 restricts the flow of gas to the upper gas chamber 577.

As a result, the pressure in the lower gas chamber 575 increases and acts against the conductive element 521 and support plate 571 to urge the support plate and conductive element up against the bias of the spring 551 toward the raised position of the conductive element corresponding to the pilot mode of the torch. The support plate 571 is axially positioned below the outlet hole 559 in the side wall 505 of the casing 503 in both the raised and lowered positions of the conductive element 521. It is understood that the narrow passage 539 may be omitted, such that the high pressure gas chamber 575 and low pressure gas chamber 577 are not in fluid communication with each other, without departing from the scope of this invention.

In operation, working gas flowing through enclosure flows between the conductive element 521 and the tip 471 and electrode 429 down through the primary gas passage 473, blowing the pilot arcs formed between the conductive element and the tip and between the conductive element and the electrode down through the primary gas passage so that the pilots arc merge into a single arc blown down toward the central exit orifice of the tip for initiating operation of the torch whereby primary working gas is exhausted from the torch in the form of an ionized plasma.

Figure 9:
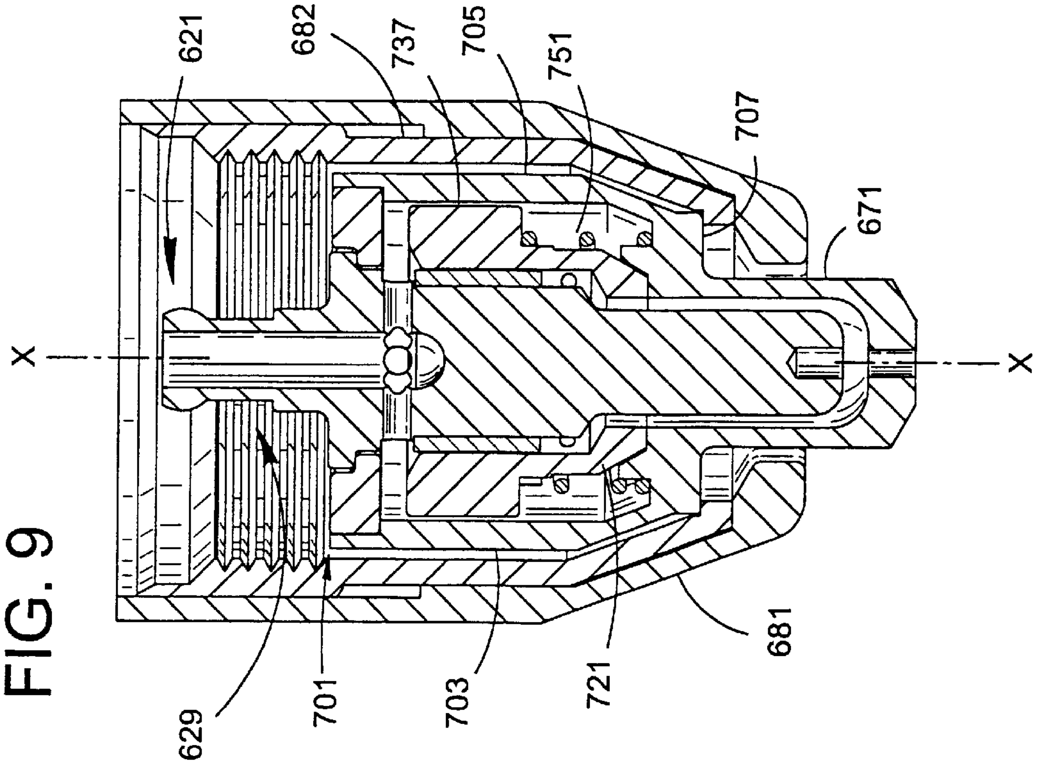
FIG. 9 is the section of FIG. 8 showing the conductive element in a raised position corresponding to the pilot mode of the torch.
Figure 8:
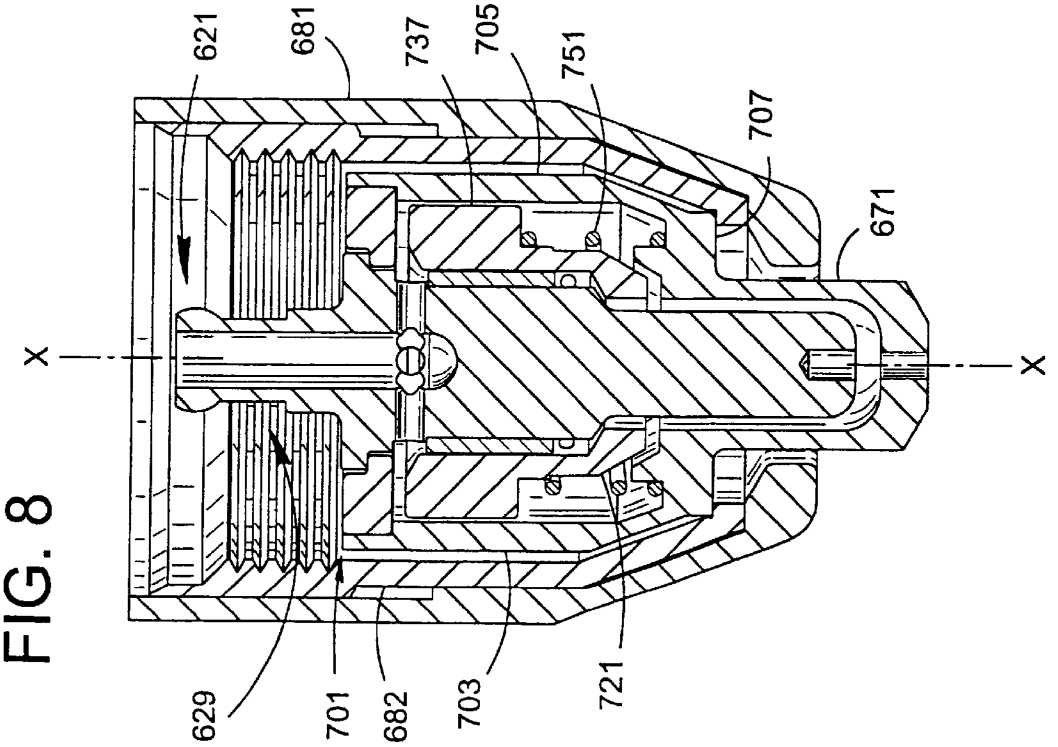
FIG. 8 is a section of a portion of a torch head of a fourth embodiment of a contact start plasma torch of the present invention with a conductive element shown in a raised position corresponding to the idle mode of the torch.

FIGS. 8 and 9 illustrate a contact assembly 701 of a fourth embodiment of a contact start plasma torch 621 of the present invention substantially similar to that of the first embodiment in that it comprises an electrode 629 in electrical communication with the negative side of the power supply, a tip 671 in electrical communication with the positive side of the power supply, a contact assembly 701 operable between an idle mode and a pilot mode of the torch, and a shield cup 681 of FIG. 1. The shield cup 681 of this fourth embodiment has an insert 682 constructed of metal and having internal threads for threadable engagement with the anode to secure the shield cup on the torch body. The side wall 705 and bottom wall 707 of the contact assembly casing 703 of this fourth embodiment are illustrated as being formed integrally with the tip 671. The biasing member is a coil spring 751 sized for radial, close contact relationship (e.g., frictional engagement) with the outer surface of the conductive element 721 and the annular projection 683 extending up from the tip 671 such that the tip, the spring and the conductive element are held in assembly with each other for removal from and installation within the torch 621 as a single unit.

Further construction and operation of the contact start plasma torch 621 of this fourth embodiment is substantially the same as that of the first embodiment and therefore will not be further described herein.

Figure 11:
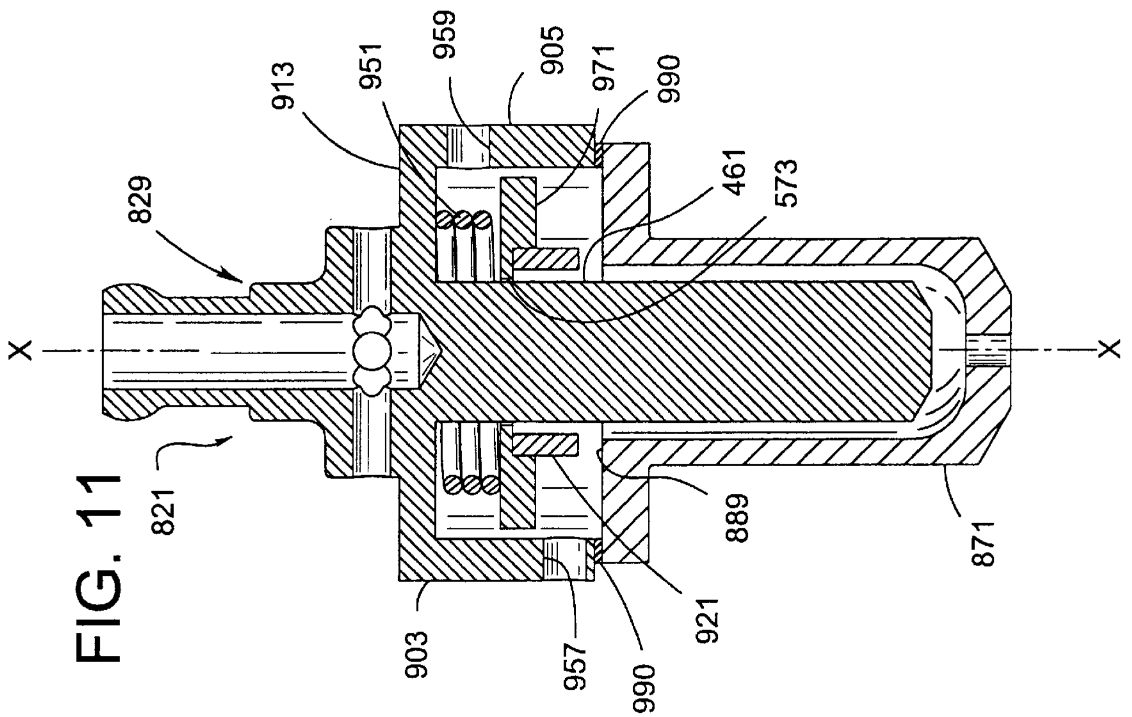
FIG. 11 is the section of FIG. 10 showing the conductive element in a raised position corresponding to the pilot mode of the torch.
Figure 10:
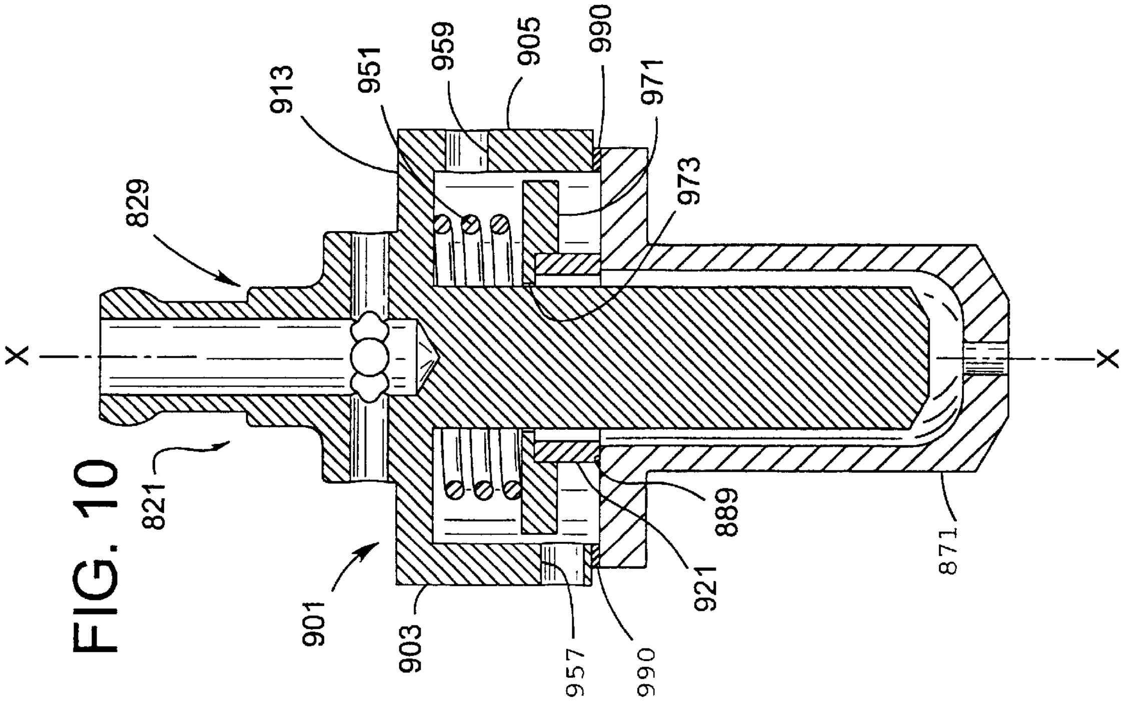
FIG. 10 is a section of a portion of a torch head of a fifth embodiment of a contact start plasma torch of the present invention with a conductive element shown in a lowered position corresponding to the idle mode of the torch.

FIGS. 10 and 11 illustrate a contact assembly 901 of a contact start plasma torch 821 of a fifth embodiment of the present invention in which the annular cap 913 and the contact assembly casing 903 are formed integrally with the electrode 829 such that the cap and casing broadly define part of the cathode body. The tip 871 is in electrical communication with the positive side of the power supply via an electrically conductive insert (not shown but similar to the insert 1082 shown in FIG. 12) connected to the shield cup (not shown but similar to the shield cup 1081 shown in FIG. 12). The contact assembly casing 903 generally seats on a radially outward extending upper surface 889 of the tip 871, with an annular insulating pad 990 disposed between the casing and the tip to electrically insulate the casing from the tip. The electrode 829 and tip 871 are secured in generally fixed relationship with each other in the torch 821. The contact assembly casing 903 has an inlet hole 957 disposed in its side wall 905 adjacent the lower end of the side wall and an outlet hole 959, also disposed in the side wall, generally adjacent the upper end of the side wall.

An annular support plate 971 constructed of an electrically conductive material is disposed within the contact assembly casing 903 and has a central opening 973 through which the electrode 829 extends. The conductive element 921 is also annular and is constructed of an electrically conductive material. The conductive element 921 is attached to the underside of the support plate 971, such as being bonded thereto, and depends therefrom for conjoint movement of the conductive element with the support plate. The conductive element 921 of this fifth embodiment is axially movable on the central longitudinal axis X of the torch 821 relative to the electrode 829, the tip 871 and the contact assembly casing 903 between a first, lowered position (FIG. 10) corresponding to the idle mode of the torch and a second, raised position (FIG. 11) corresponding to the pilot mode of the torch. In the lowered position of the conductive element 921, the conductive element is in electrical communication with the upper surface 889 of the tip 871 to provide an electrically conductive path between the electrode and the tip, i.e., between the positive and negative sides of the power supply. It is understood that in its lowered position the conductive element 921 need not engage the upper surface 889 of the tip 871, as long as it is positioned sufficiently close to the tip to provide an electrically conductive path between the positive and negative sides of the power supply.

In its raised position (FIG. 11), the conductive element 921 is positioned up away from the tip 871 (i.e., a distance greater than the distance between the conductive element and the tip in the lowered position of the conductive element) such that a pilot formed between the tip and the conductive element is adapted for being blown down toward the central exit orifice of the tip for initiating operation of the torch whereby working gas in the primary gas flow path is exhausted from the torch in the form of an ionized plasma. The biasing member of this fifth embodiment comprises a coil spring 951 that seats on the top of the support plate 971 and extends up into contact with the contact assembly cap 913 (i.e., the cathode body). The spring 951 is constructed of an electrically conductive material to provide electrical communication between the contact assembly cap 913 and the annular plate 971, and is preferably sized to remain in compression for continuously biasing the conductive element 921 toward its lowered position corresponding to the idle mode of the torch.

Further construction and operation of this fifth embodiment is substantially the same as the third embodiment of FIGS. 6 and 7 and therefore will not be further described herein.

Figure 12:
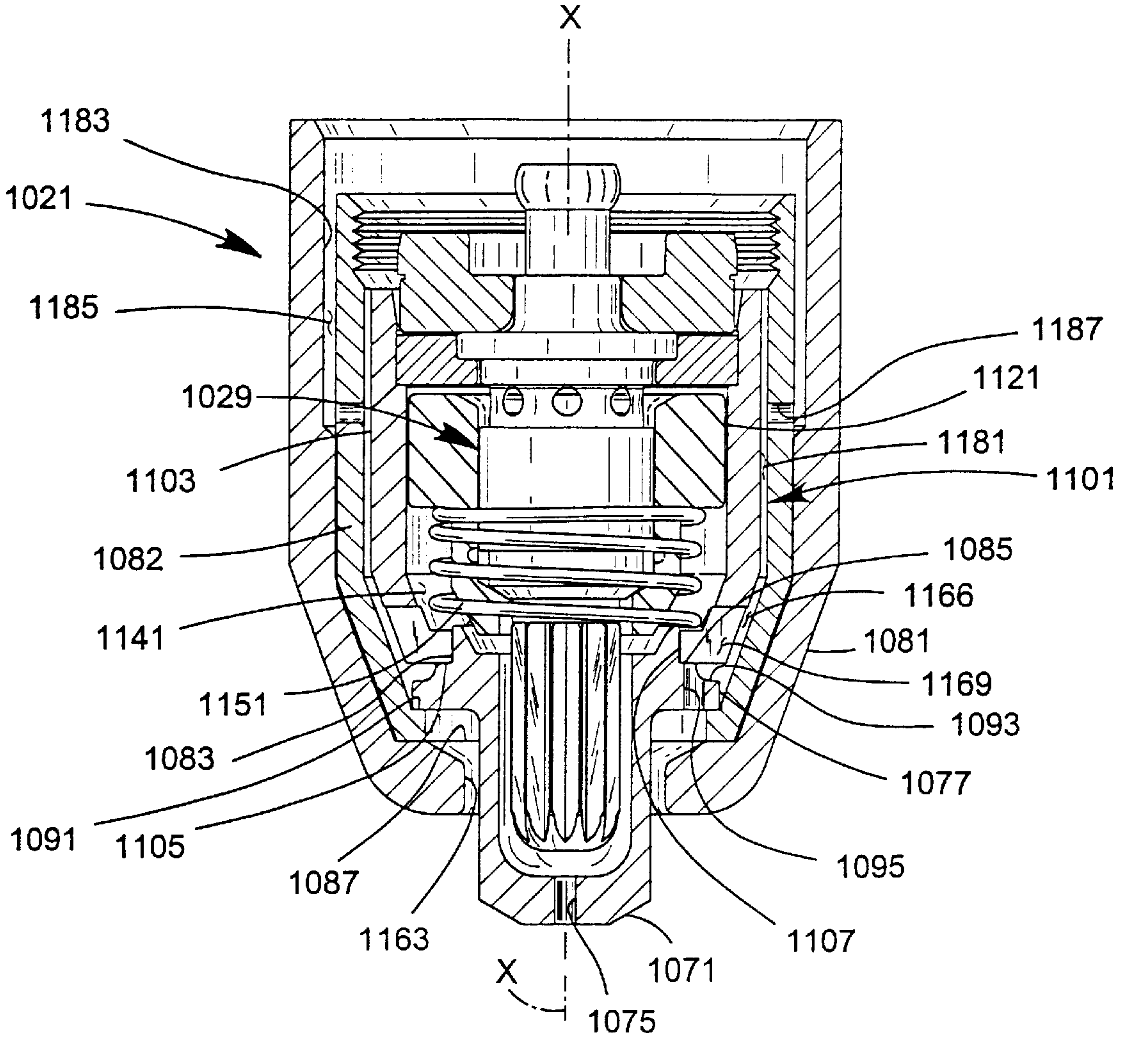
FIG. 12 is a section of a portion of a torch head of a sixth embodiment of a contact start plasma torch of the present invention with a conductive element shown in a raised position corresponding to the idle mode of the torch.

FIG. 12 illustrates a contact assembly 1101 of a sixth embodiment of a contact start plasma torch 1021 of the present invention substantially similar to that of the first embodiment in that it comprises an electrode 1029 in electrical communication with the negative side of the power supply, a tip 1071 in electrical communication with the positive side of the power supply, a contact assembly 1101 operable between an idle mode and a pilot mode of the torch, and a shield cup 1081. The shield cup 1081 of this sixth embodiment has an insert 1082 connected to its inner surface and constructed of an electrically conductive material. The insert 1082 has internal threads for threadable engagement with the anode (not shown but similar to anode 33 of FIG. 1) to secure the shield cup on the torch body and to provide electrical connection of the insert with the anode (i.e. to provide electrical communication between the insert and the positive side of the power supply). The insert 1082 has an annular shoulder 1091 formed generally at its lower end upon which the upper end 1077 of the tip 1071 is seated. The insert 1082 is otherwise spaced radially outward of the upper end 1077 of the tip 1071 to define the secondary gas chamber 1166. The insert 1082 also surrounds the contact assembly casing 1103 in radially spaced relationship therewith to define an exhaust channel 1181 in fluid communication with the secondary gas chamber 1166 for directing a portion of the gas in the secondary gas chamber to be exhausted from the torch 1021 other than through the central opening 1163 of the shield cup 1081. An upper portion 1183 of the inner surface of the shield cup 1081 is spaced radially outward from the insert 1082 to define an exhaust passage 1185 for exhausting gas from the exhaust channel 1183 out of the torch 1021 via the top of the shield cup. Metering orifices 1187 extend radially outward through the insert 1082 to provide fluid communication between the exhaust channel 1183 and the exhaust passage 1185.

The tip 1071 of this sixth embodiment is similar to that of the first embodiment in that an annular projection 1083 extends up from the top of the tip and is positioned generally centrally thereon to define an upwardly facing annular shoulder 1085 disposed radially outward of the annular projection and an upwardly facing contact surface 1087 disposed radially inward of the projection. The bottom wall 905 of the contact assembly casing 903 seats on the annular shoulder 1085 extending radially outward of the projection 1083. An annular notch 1093 is formed in the peripheral edge of the upper end 1077 of the tip 1071, radially outward of the annular shoulder 1085, so that the tip is axially spaced from the bottom wall 1107 of the contact assembly casing 1103. Three metering orifices 1095 (one of which is shown in FIG. 12) extend axially through the upper end 1077 of the tip 1071 generally at the annular notch 1093 and are in fluid communication with the secondary gas chamber 1166. The metering orifices 1095 in the tip 1071 are also in fluid communication with the central opening 1163 of the shield cup 1081 for exhausting gas in the secondary gas chamber 1166 from the torch 1021.

The orifices 1095 of the tip 1071 and the metering orifices 1187 of the shield cup insert 1082 are preferably sized relative to each other to meter the flow rate of gas from the secondary gas chamber 1166 in accordance with the current at which the torch is operated. In other words, the metering orifices 1095, 1187 are sized relative to each other such that a predetermined portion of gas in the secondary gas chamber 1166 is exhausted from the torch 1021 via the central opening 1163 of the shield cup 1081 and the remaining gas in the secondary gas chamber is exhausted from the top of the shield cup.

As an example, for a torch operating at 80 amps, the central exit orifice 1075 of the tip 1071 has a diameter of about 0.052 inches, the tip has three metering orifices 1095 each having a diameter of about 0.052 inches and the shield cup insert 1082 has four metering orifices 1187 each having a diameter of about 0.043 inches. As another example, for a torch operating at 55 amps the central exit orifice 1075 of the tip 1071 has a diameter of about 0.045 inches, the tip has three metering orifices 1095 each having a diameter of about 0.043 inches and the shield cup insert 1082 has four metering orifices 1187 each having a diameter of about 0.043 inches. As a further example, for a torch operating at 40 amps the central exit orifice 1075 of the tip 1071 has a diameter of about 0.031 inches, the tip has three metering orifices 1095 each having a diameter of about 0.040 inches and the shield cup insert 1082 has two metering orifices 1187 each having a diameter of about 0.043 inches.

The working gas pressure supplied to the torch is in the range of about 60–70 psi. For example, for a torch operating at about 80 amps, the working gas pressure supplied to the torch is about 70 psi and for torches operating at about 55 amps and 40 amps the working gas pressure supplied to the torch is about 65 psi. The flow rate at which working gas is exhausted from the central exit orifice 1075 of the tip 1071 is preferably in the range of about 50-150 standard cubic feet per hour (scfh), with the flow rate increasing with the current level at which the torch is operated. For example, for torches operating at about 40 amps, 55 amps and 80 amps, the flow rate at which working gas is exhausted from the central exit orifice 1075 of the tip 1071 is about 50 scfh, 80 scfh and 110 scfh, respectively. The flow rate at which working gas is exhausted from the central opening 1163 of the shield cup 1081 is preferably in the range of about 50-300 scfh, with the flow rate increasing with the current level at which the torch is operated. For example, for torches operating at about 40 amps, 55 amps and 80 amps, the flow rate at which working gas is exhausted from the central opening 1163 of the shield cup 1081 is about 125 standard cubic feet per hour (scfh), 200 scfh and 290 scfh, respectively. The flow rate at which working gas is exhausted from the shield cup 1081 via the metering orifices 1187 of the shield cup insert 1082 is preferably in the range of about 50-150 scfh.

Thus it will be seen that the cathode body of this sixth embodiment is broadly defined by the cathode (not shown but similar to the cathode 25 of FIG. 1) and the electrode 1029, and the anode body is broadly defined by the anode, the shield cup insert 1082, the contact assembly casing 1103 and the tip 1071. In other words, the tip 1071 provides electrical communication between the insert 1082 and the contact assembly casing 1103. It is understood that the contact assembly casing 1103 may alternatively be constructed of an electrically non-conductive material without departing from the scope of this invention. For example, the coil spring 1151 may seat on the tip 1071 instead of the contact assembly casing 1103 so that the spring is in electrical communication with the positive power supply via the anode, the shield cup insert 1082 and the tip. It is also contemplated that the contact assembly casing 1103 and the insert 1082 may be integrally formed such that the casing is defined by the insert and is connected to the shield cup 1081 for installation in and removal from the torch 1021 as a single unit without departing from the scope of this invention.

Further construction and operation of the contact start plasma torch 1021 of this sixth embodiment is substantially the same as that of the first embodiment and therefore will not be further described herein except with respect to the flow of gas through the secondary gas flow path. Working gas in the lower gas chamber 1141 of the contact assembly 1101 is directed to flow through a secondary gas flow path comprising the openings 1169 in the contact assembly casing 1103, the secondary gas chamber 1166, and the metering orifices 1095 in the upper end 1077 of the tip 1071 for exhaustion from the torch 1021 via the central opening 1163 of the shield cup 1081. Additionally, a portion of gas in the secondary gas chamber 1166 is directed to flow through a tertiary gas flow path comprising the exhaust channel 1183 formed between the insert 1082 and the contact assembly casing 1103, the metering orifices 1187 in the insert and the exhaust passage 1185 formed between the insert and the shield cup 1081 for exhaustion from the torch via the top of the shield cup. Providing this tertiary flow path allows the gas pressure of working gas received in the torch to be increased for use in moving the conductive element 1121 against the bias of the spring 1151 without negatively effecting the desired gas flow through the central exit opening 1075 of the tip 1071 and the central opening 1163 of the shield cup 1081.

It is understood that the tip 1071 having metering orifices 1095 and the shield cup 1081 having an insert 1082 with metering orifices 1187 may be used in plasma torches other than a contact start plasma torch, such as any plasma torch having a primary gas flow path and a secondary gas flow path, without departing from the scope of this invention.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A contact start plasma torch comprising:

a cathode body adapted for electrical communication with the negative side of a power supply;

an anode body adapted for electrical communication with the positive side of the power supply;

a primary gas flow path for directing working gas from a source of working gas through the torch; and a conductive element constructed of an electrically conductive material and being free from fixed connection with the cathode body and the anode body;

the torch being operable between an idle mode in which the conductive element provides an electrically conductive path between the cathode body and the anode body and a pilot mode in which a pilot arc formed between the conductive element and at least one of said cathode body and said anode body is adapted for initiating operation of the torch by exhausting working gas in the primary gas flow path from the torch in the form of an ionized plasma.

2. A contact start plasma torch as set forth in claim 1 wherein the conductive element defines a portion of the primary gas flow path in the pilot mode of the torch, the pilot arc being formed between the conductive element and said at least one of said cathode body and said anode body generally within said portion of the primary gas flow path defined by the conductive element.

3. A contact start plasma torch as set forth in claim 1 wherein the conductive element is movable relative to the cathode body and the anode body between a first position corresponding to the idle mode of the torch and a second position corresponding to the pilot mode of the torch, the second position of the conductive element being substantially spaced from the first position of the conductive element, movement of the conductive element toward its second position causing a pilot arc to form between the conductive element and said at least one of said cathode body and said anode body.

4. A contact start plasma torch as set forth in claim 3 wherein the cathode body and the anode body are held in generally fixed relationship with each other as the conductive element moves between its first and second position.

5. A contact start plasma torch as set forth in claim 3 further comprising a biasing member for biasing the conductive element toward its first position corresponding to the idle mode of the torch.

6. A contact start plasma torch as set forth in claim 5 wherein the biasing member is constructed of an electrically conductive material, said biasing member being in electrical communication with the conductive element as the conductive element moves between its first and second positions.

7. A contact start plasma torch as set forth in claim 6 wherein the biasing member is in electrical communication with the anode body to provide electrical communication between the conductive element and the positive side of the power supply as the conductive element moves between its first and second positions.

8. A contact start plasma torch as set forth in claim 6 wherein the biasing member is in electrical communication with the cathode body to provide electrical communication between the conductive element and the negative side of the power supply as the conductive element moves between its first and second positions.

9. A contact start plasma torch as set forth in claim 5 wherein the conductive element is movable relative to the cathode body and the anode body toward the second position of the conductive element against the bias of the biasing member by pressurized gas in the torch.

10. A contact start plasma torch as set forth in claim 9 wherein the pressurized gas in the torch is the working gas flowing through the primary gas flow path of the torch.

11. A contact start plasma torch as set forth in claim 3 wherein in the first position of the conductive element corresponding to the idle mode of the torch the conductive element engages at least one of the cathode body and the anode body, the conductive element being spaced from said at least one of the cathode body and the anode body in the second position of the conductive element corresponding to the pilot mode of the torch, movement of the conductive element toward its second position causing a pilot arc to form between the conductive element and said at least one of the cathode body and the anode body.

12. A contact start plasma torch as set for in claim 3 wherein the cathode body comprises an electrode, the anode body surrounding the electrode in spaced relationship therewith to partially define the primary gas flow path of the torch for directing a working gas through the torch in a downstream direction, said anode body having a central exit orifice in fluid communication with the primary gas flow path for exhausting working gas from the torch.

13. A contact start plasma torch as set forth in claim 12 wherein the conductive element is movable longitudinally relative to the electrode.

14. A contact start plasma torch as set forth in claim 13 wherein the conductive element surrounds the electrode in coaxial relationship therewith on a central longitudinal axis of the torch, the conductive element being movable longitudinally relative to the electrode on the central longitudinal axis of the torch between the first and second positions of the conductive element.

15. A contact start plasma torch as set forth in claim 12 wherein the electrode has a longitudinally extending side surface and a bottom surface oriented generally radially relative to the longitudinal side surface of the electrode, the bottom surface being in generally longitudinally opposed relationship with the central exit opening of the anode body, the conductive element being positioned relative to the bottom surface of the electrode such that the pilot arc formed between the conductive element and the at least one of the electrode and the anode body is formed within the primary gas flow path upstream from the bottom surface of the electrode whereby the pilot arc is blown by working gas down through the primary gas flow path toward the central exit orifice of the anode body for exhausting working gas from the torch in the form of an ionized plasma.

16. A contact start plasma torch as set forth in claim 12 wherein the anode body comprises a tip surrounding the electrode in spaced relationship therewith to at least partially define the primary gas flow path of the torch, the tip having a central exit orifice defining the central exit orifice of the anode body, movement of the conductive element toward its second position corresponding to the pilot mode of the torch causing a pilot arc to form between the conductive element and at least one of the electrode and the tip generally within the primary gas flow path for being blown by working gas in the primary gas flow path toward the central exit opening of the tip.

17. A contact start plasma torch as set forth in claim 16 wherein the electrode and the tip are secured in the torch in generally fixed relationship relative to each other as the conductive element is moved between its first and second positions.

18. A contact start plasma torch as set forth in claim 16 wherein the anode body further comprises a contact assembly having a generally tubular casing surrounding the conductive element and being constructed of an electrically conductive material, the tip being electrically connected to the contact assembly casing.

19. A contact start plasma torch as set forth in claim 18 wherein the contact assembly casing is formed integrally with the tip.

20. A contact start plasma torch as set forth in claim 18 wherein the contact assembly casing is formed integrally with the electrode.

21. A contact start plasma torch as set forth in claim 18 further comprising a biasing member arranged for biasing the conductive element toward its first position corresponding to the idle mode of the torch.

22. A contact start plasma torch as set forth in claim 21 wherein the biasing member is constructed of an electrically conductive material, said biasing member being in electrical communication with the conductive element as the conductive element moves between its first and second positions, the biasing member further being in electrical communication with the contact assembly casing such that the conductive element remains in electrical communication with the positive side of the power supply as the conductive element moves between its first and second positions.

23. A contact start plasma torch as set forth in claim 21 wherein the tip, the conductive element and the biasing member are held in assembly with each other for installation in and removal from the torch as a single unit.

24. A contact start plasma torch as set forth in claim 18 wherein the contact assembly further comprises an enclosure surrounding the electrode for containing gas therein, the conductive element being disposed generally within the enclosure such that gas in the enclosure urges the conductive element toward its second position corresponding to the pilot mode of the torch.

25. A contact start plasma torch as set forth in claim 24 wherein the enclosure has a high pressure gas chamber therein for receiving gas into the enclosure, a low pressure gas chamber therein, and a narrow passage providing fluid communication between the high pressure gas chamber and the low pressure gas chamber to direct in the high pressure gas chamber through the narrow passage to the low pressure gas chamber, the conductive element being positioned in the enclosure such that gas in the high pressure chamber urges the conductive element toward the low pressure gas chamber in the pilot mode of the torch for moving the conductive element toward its second position.

26. A contact start plasma torch as set forth in claim 25 wherein the enclosure is at least partially defined by the contact assembly casing.

27. A contact start plasma torch as set forth in claim 25 wherein the high pressure gas chamber, the narrow passage and the low pressure gas chamber further define the primary gas flow path of the torch whereby gas contained in the enclosure is working gas directed through the primary gas flow path.

28. A contact start plasma torch as set forth in claim 27 wherein the conductive element has holes extending therethrough in fluid communication with the lower gas chamber of the contact assembly to further define the primary gas flow path of the torch, the holes being disposed upstream from the pilot arc formed between the conductive element and the at least one of said electrode and tip as the conductive element moves toward its second position whereby working gas flowing downstream through the primary gas flow path blows the pilot arc downstream toward the central exit orifice of the tip.

29. A contact start plasma torch as set forth in claim 3 wherein the first position of the conductive element corresponding to the idle mode of the torch the conductive element simultaneously engages the cathode body and the anode body, the conductive element being spaced from the cathode body and the anode body in the second position of the conductive element corresponding to the pilot mode of the torch, movement of the conductive element toward its second position causing a first pilot arc to form between the conductive element and the cathode body generally within the primary gas flow path and causing a second pilot arc to form between the conductive element and the anode body generally within the primary gas flow path whereby working gas in the primary gas flow path blows the first and second pilot arcs through the primary gas flow path such that the pilot arcs merge to form a single pilot arc directed to flow downstream through the primary gas flow path.

30. A contact start plasma torch as set forth in claim 29 wherein the cathode body comprises an electrode, the anode body comprising a tip surrounding the electrode in spaced relationship therewith to at least partially define the primary gas flow path of the torch, the tip having a central exit orifice in fluid communication with the primary gas flow path for exhausting working gas from the primary gas flow path of the torch.

31. A contact start plasma torch as set forth in claim 29 further comprising a biasing member biasing the conductive element toward its first position corresponding to the idle mode of the torch in which the conductive element is in engagement with the cathode body and the anode body.

32. A contact start plasma torch as set forth in claim 31 wherein the conductive element is movable relative to the cathode body and the anode body toward its second position corresponding to the pilot mode of the torch against the bias of the biasing member by working gas flowing through the primary gas flow path of the torch.

33. A contact start plasma torch of the type having a primary gas flow path for directing a working gas through the torch whereby working gas is exhausted from the torch in the form of an ionized plasma, said torch comprising:

an electrode having a longitudinally extending side surface and a bottom surface;

a tip surrounding the electrode in spaced relationship therewith to at least partially define the primary gas flow path of the torch for directing working gas through the torch in a downstream direction, the tip having a central exit orifice in fluid communication with the primary gas flow path for exhausting working gas from the torch, the bottom surface of the electrode being in longitudinally opposed relationship with the central exit orifice of the tip; and opposed contact surfaces in the torch, at least one of the contact surfaces being movable relative to the other one of said contact surfaces;

the torch being operable between an idle mode in which the contact surfaces are positioned relative to each other to provide an electrically conductive path therebetween and a pilot mode in which the contact surfaces are in spaced relationship with each other whereby a pilot arc is formed between the contact surfaces;

the contact surfaces being disposed in the torch upstream from the bottom surface of the electrode whereby the pilot arc is formed generally within the primary gas flow path upstream from the bottom surface of the electrode and is blown by working gas in the primary gas flow path toward the central exit orifice of the tip for exhausting working gas from the tip in the form of an ionized plasma.

34. A conductive element for use in a contact start plasma torch of the type having an electrode in electrical communication with the negative side of a power supply and a tip surrounding the electrode in spaced relationship therewith to at least partially define a primary gas flow path of the torch, the tip being in electrical communication with the positive side of the power supply and having a central exit orifice in fluid communication with the primary gas flow path for exhausting working gas from the tip in the form of an ionized plasma, said conductive element comprising:

a generally cup-shaped body constructed of an electrically conductive material, said conductive element being adapted for movement relative to the electrode and the tip between a first position corresponding to an idle mode of the torch in which the conductive element provides an electrically conductive path between the positive side of the power supply and the negative side of the power supply and a second position spaced from the first position of the conductive element, the second position of the conductive element corresponding to a pilot mode of the torch whereby movement of the conductive element toward its second position forms a pilot arc generally within the primary gas flow path capable of initiating operation of the torch for exhausting working gas from the torch in the form of an ionized plasma.

35. A conductive element as set forth in claim 34 further comprising a contact surface adapted for engaging the electrode in the first position of the conductive element, the contact surface being further adapted for spaced relationship with the electrode as the conductive element is moved towards its second position to form the pilot arc between the electrode and the contact surface of the conductive element.

36. A conductive element as set forth in claim 34 further comprising at least one hole extending therethrough, said at least one hole partially defining the primary gas flow path for directing working gas to flow downstream between the tip and the electrode toward the central exit orifice of the tip.

37. A conductive element as set forth in claim 34 in combination with an insulating sleeve constructed of an electrically non-conductive material and adapted for being interposed between at least a portion of the conductive element and the electrode to electrically insulate said at least a portion of the conductive element from the electrode.

38. A combination conductive element and insulating sleeve as set forth in claim 37 wherein the insulating sleeve is connected to the conductive element such that the conductive element and insulating sleeve are installed in and removed from the torch as a single unit.

39. A combination conductive element and insulating sleeve as set forth in claim 37 wherein the insulating sleeve is a gas distributor having at least one hole extending therethrough, said at least one hold partially defining the primary gas flow path for directing working gas to flow downstream between the tip and the electrode toward the central exit orifice of the tip.

40. An electrode for use in a contact start plasma torch of the type having a primary gas flow path for directing a working gas in a downstream direction through the torch, a tip surrounding the electrode in spaced relationship therewith to at least partially define the primary gas flow path of the torch, a contact surface in the torch for forming a pilot arc in the primary gas flow path of the torch and a central exit orifice in the tip communicating with the primary gas flow path for exhausting working gas from the tip in the form of an ionized plasma, the electrode comprising:

a generally cylindrical body having a longitudinally extending side surface, a bottom surface for longitudinally opposed positioning relative to the central exit orifice of the tip, and a contact surface disposed above the bottom surface of the electrode, the contact surface of the electrode being positionable relative to said contact surface of the torch to provide an electrically conductive path therethrough for use in forming a pilot arc between the electrode contact surface and the torch contact surface generally within the primary gas flow path of the torch upstream from the bottom surface of the electrode.

41. An electrode as set forth in claim 40 wherein the electrode comprises a lower end including the bottom surface of the electrode, and a mid-section disposed above the lower end having an outer diameter substantially greater than the diameter of the lower end of the electrode, the contact surface being intermediate the mid-section and the lower end of the electrode.

42. An electrode as set forth in claim 41 wherein the contact surface tapers inward toward the lower end of the electrode.

43. An electrode as set forth in claim 40 further comprising an annular collar extending generally radially outward from the electrode for axially positioning the electrode in the torch.

44. An electrode as set forth in claim 43 wherein said annular collar is further adapted for radially positioning the electrode in the torch.

45. A tip for use in a contact start plasma torch of the type having a primary gas flow path for directing a working gas through the torch whereby the working gas is exhausted from the torch in the form of an ionized plasma, said tip being generally cup-shaped and having a central exit opening adapted for fluid communication with the primary gas flow path for exhausting working gas from the tip in the form of an ionized plasma, the tip further having a top surface and an annular projection extending up from the top surface for use in radially positioning the tip in the torch.

46. A tip as set forth in claim 45 further wherein a portion of the top surface extends generally radially outward from the annular projection for axially positioning the tip in the torch.

47. A tip as set forth in claim 46 wherein the portion of the top surface of the tip extending radially outward from the annular projection has at least one metering orifice extending generally axially therethrough to meter the flow of gas in the torch.

48. A tip as set forth in claim 45 wherein the torch is further of the type having a conductive element capable of axial movement within the torch for use in forming a pilot arc in the torch, the annular projection of the tip inhibiting radial movement of the conductive element upon axial movement of the conductive element in the torch, the annular projection further inhibiting the flow of working gas in the torch between the conductive element and the tip.

49. A tip as set forth in claim 48 further comprising a contact surface engageable by the conductive element to limit axial movement of the conductive element in the torch, the contact surface being defined by a portion of the top surface of the tip extending radially inward from the annular projection.

50. A tip for use in a plasma torch of the type having a primary gas flow path for directing a working gas through the torch whereby the working gas is exhausted from the torch in the form of an ionized plasma and a secondary gas flow path for directing gas through the torch whereby the gas is exhausted from the torch other than in the form of an ionized plasma, said tip being generally cup-shaped and having a central exit opening adapted for fluid communication with the primary gas flow path for exhausting working gas from the tip in the form of an ionized plasma, the tip further having at least one metering orifice adapted for fluid communication with the secondary gas flow path for metering the flow of gas through the secondary gas flow path.

51. A contact assembly for use in a contact start plasma torch of the type having a primary gas flow path for directing a working gas through the torch, an electrode in electrical communication the negative side of a power supply and a tip surrounding the electrode in spaced relationship therewith to at least partially define the primary gas flow path of the torch, the tip being in electrical communication with the positive side of the power supply and having a central exist orifice in fluid communication with the primary gas flow path for exhausting working gas from the torch in the form of an ionized plasma, said contact assembly comprising:

a conductive element constructed of an electrically conductive material;

an enclosure surrounding the conductive element in fluid communication with a source of pressurized gas for receiving gas into the enclosure, the conductive element being disposed at least partially within the enclosure and being movable relative to the enclosure, the electrode and the tip in response to pressurized gas received in the enclosure whereby movement of the conductive element is adapted to form a pilot arc in the torch.

52. A contact assembly as set forth in claim 51 wherein the enclosure has a high pressure gas chamber, a low pressure gas chamber and a narrow passage providing fluid communication between the high pressure gas chamber and the low pressure gas chamber, the high pressure gas chamber being in fluid communication with the source of pressurized gas such that pressurized gas is received in the high pressure gas chamber and flows through the narrow passageway to the low pressure gas chamber, the conductive element being positioned in the enclosure so that gas in the high pressure chamber urges the conductive element to move toward the low pressure gas chamber whereby movement of the conductive element toward the low pressure gas chamber is adapted to form a pilot arc in the torch.

53. A contact assembly as set forth in claim 51 further comprising a biasing member in the enclosure for biasing the conductive element in a direction opposite the direction which the conductive element is moved to formed the pilot arc.

54. A contact assembly as set forth in claim 51 wherein the enclosure is at least partially defined by a tubular casing surrounding the conductive element, the casing being adapted for electrical communication with the positive side of the power supply.

55. A contact assembly as set forth in claim 54 wherein the contact assembly casing is formed integral with the tip.

56. A contact assembly as set forth in claim 54 wherein the contact assembly casing is formed integral with the electrode.

57. An electrode assembly for use in a contact start plasma torch of the type having a cathode body adapted for electrical communication with the negative side of a power supply and an anode body adapted for electrical communication with the positive side of the power supply, the electrode assembly comprising;

an electrode extending longitudinally within the torch and defining at least in part the cathode body of the torch; and an insulating sleeve surrounding at least a portion of the electrode, the insulating sleeve being secured to the electrode and constructed of an electrically non-conductive material to insulate said at least a portion of the electrode against electrical communication with the anode body of the torch.

58. A method of starting a contact start plasma torch of the type having a cathode body in electrical communication with the negative side of a power supply and an anode body in electrical communication with the positive side of the power supply, the anode body being positioned relative to the cathode body to at least partially define a primary gas flow path of the torch, the torch having a central exit orifice in fluid communication with the primary gas flow path for exhausting working gas from the torch in the form of an ionized plasma, the method comprising the acts of:

causing an electrical current to flow along an electrically conductive path comprising the anode body, the cathode body and a conductive element electrically bridging the cathode body and the anode body in a first position of the conductive element corresponding to an idle mode of the torch;

directing working gas from a course of working gas through the primary gas flow path of the torch;

effecting movement of the conductive element relative to the cathode body and the anode body toward a second position corresponding to a pilot mode of the torch whereby a pilot arc is formed between the conductive element and at least one of said cathode body and said anode body as the conductive element is moved toward its second position; and blowing the pilot arc through the primary gas flow path toward the central exit orifice of the torch such that working gas is exhausted from the primary gas flow path of the torch in the form of an ionized plasma.

59. The method of claim 58 wherein the pilot arc is formed generally within the primary gas flow path of the torch whereby the pilot arc is blown through the primary gas flow path toward the central exit orifice of the torch by working gas flowing through the primary gas flow path of the torch.

60. The method of claim 59 wherein the act of effecting movement of the conductive element relative to the cathode body and the anode body is conducted while securing the cathode body and the anode body in generally fixed position relative to each other.

61. The method of claim 58 wherein the act of effecting movement of the conductive element relative to the cathode body and the anode body toward the second position of the conductive element is accomplished by a force generated by the flow of working gas downstream through the primary gas flow path.

62. A method of starting a contact start plasma torch of the type having an electrode positioned on a longitudinal axis of the torch in electrical communication with the negative side of a power supply, the electrode having a longitudinally extending side surface and a bottom surface, and an anode body in electrical communication with the positive side of the power supply, the anode body surrounding the electrode in spaced relationship therewith to at least partially define a primary gas flow path of the torch for directing working gas through the torch, the anode body having a central exit orifice in fluid communication with the primary gas flow path for exhausting working gas from the torch, the anode being arranged relative to the electrode such that the central exit orifice is in longitudinally opposed relationship with the bottom surface of the electrode, said method comprising the acts of:

positioning opposed contact surfaces of the torch relative to each other generally within the primary gas flow path upstream from the bottom surface of the electrode to provide an electrically conductive path through the contact surfaces;

repositioning the contact surfaces relative to each other to form a pilot arc therebetween in the primary gas flow path of the torch upstream from the bottom surface of the electrode; and directing working gas from a source of working gas through the primary gas flow path of the torch to blow the pilot arc downstream within the primary gas flow path toward the central exit orifice of the anode body.

63. The method set forth in claim 62 wherein one of the contact surfaces is defined by a conductive element disposed in the torch and constructed of an electrically conductive material, and the other one of the contact surfaces is defined by at least one of the electrode and the anode body, the act of positioning opposed contact surfaces relative to each other comprising positioning the conductive element in the torch in a first position relative to the electrode and the anode body to provide an electrically conductive path between the electrode and the anode body, and the act of repositioning the contact surfaces relative to each other comprising effecting movement of the conductive element relative to the electrode and the anode body toward a second position spaced from the first position whereby the pilot arc is formed between the conductive element and at least one of said electrode and said anode body generally within the primary gas flow path as the conductive element is moved toward its second position.

64. The method of claim 63 wherein the act of effecting movement of the conductive element relative to the electrode and the anode body toward its second position is accomplished by a force generated by the flow of working gas downstream through the primary gas flow path.

65. A shield cup for use in a plasma torch of the type having a primary gas flow path for directing a working gas through the torch whereby the working gas is exhausted from the torch in the form of an ionized plasma and a secondary gas flow path for directing gas through the torch whereby the gas is exhausted from the secondary gas flow path, the shield cup being generally cup-shaped and configured for at least partially defining the secondary gas flow path, said shield cup being further configured to define a tertiary gas flow path in fluid communication with the secondary gas flow path for further exhausting gas in the secondary gas flow path from the torch, the shield cup having at least one metering orifice in said tertiary gas flow path for metering the flow of gas through the tertiary gas flow path.

* * * * *